US012598489B2

(12) United States Patent (10) Patent No.: US 12,598,489 B2
Geng et al. (45) Date of Patent: Apr. 7, 2026

(54) COMMUNICATION METHOD, DEVICE, AND SYSTEM

(71) Applicant: Huawei Technologies Co., Ltd., Shenzhen (CN)

(72) Inventors: Tingting Geng, Shanghai (CN); Yedan Wu, Shanghai (CN); Le Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 661 days.

(21) Appl. No.: 17/656,756

(22) Filed: Mar. 28, 2022

(65) Prior Publication Data

US 2022/0217561 A1 Jul. 7, 2022

Related U.S. Application Data

(63) Continuation of application No. PCT/CN2019/109231, filed on Sep. 29, 2019.

(51) Int. Cl.
H04W 24/08 (2009.01)
H04W 4/029 (2018.01)
H04W 52/02 (2009.01)

(52) U.S. Cl.
CPC ........... H04W 24/08 (2013.01); H04W 4/029 (2018.02); H04W 52/0209 (2013.01)

(58) Field of Classification Search
None
See application file for complete search history.

(56) References Cited

U.S. PATENT DOCUMENTS 11,297,478 B2 * 4/2022 Yadav .................... G01C 21/20
2012/0263145 A1 10/2012 Marinier et al.
(Continued)

FOREIGN PATENT DOCUMENTS

CN 101540987 A 9/2009
CN 102131220 A 7/2011
(Continued)

OTHER PUBLICATIONS

CATT, "Considerations on NTN mobility", 3GPP TSG-RAN WG3 #103, R3-190242, Athens, Greece, Feb. 25-Mar. 1, 2019, 6 pages.
(Continued)

*Primary Examiner* — Saumit Shah
(74) *Attorney, Agent, or Firm* — Slater Matsil, LLP

(57) ABSTRACT

Embodiments of this application provide a communication method, device, and system, to reduce energy consumption of a terminal device and accelerate reselection performed by the terminal device. In this solution, a network device determines a plurality of sub-areas, and sends area configuration information to the terminal device. The terminal device receives the area configuration information, determines a first sub-area based on the area configuration information, and performs measurement based on information about one or more neighboring frequencies corresponding to the first sub-area. A geographical area range including the plurality of sub-areas includes a coverage area of a first cell, the area configuration information indicates information about the plurality of sub-areas, and the first sub-area is a sub-area in which the terminal device is currently located in the plurality of sub-areas.

20 Claims, 11 Drawing Sheets

(56)                References Cited

U.S. PATENT DOCUMENTS

| 2014/0031058 A1* | 1/2014 | Zhang | H04L 43/045 |
| | | | 455/456.1 |
| 2017/0374574 A1 | 12/2017 | Lee et al. | |
| 2019/0007812 A1* | 1/2019 | Shilov | H04W 4/06 |
| 2020/0260308 A1* | 8/2020 | Jin | H04B 17/318 |
| 2021/0051444 A1* | 2/2021 | Ryu | H04W 4/029 |
| 2021/0068013 A1* | 3/2021 | Cheng | H04W 48/18 |
| 2021/0153281 A1* | 5/2021 | Deogun | H04W 76/16 |
| 2022/0030532 A1* | 1/2022 | Hajir | H04B 7/18513 |
| 2022/0278742 A1* | 9/2022 | Gineste | H04B 7/18504 |

FOREIGN PATENT DOCUMENTS

| CN | 102224745 A | 10/2011 |
| CN | 107635273 A | 1/2018 |
| CN | 108040351 A | 5/2018 |
| CN | 108810920 A | 11/2018 |
| WO | 2013020522 A1 | 2/2013 |
| WO | 2019170866 A1 | 9/2019 |

OTHER PUBLICATIONS

CATT, "Considerations on NTN mobility", 3GPP TSG-RAN WG3 #102, R3-186368, Spokane, WA, US, Nov. 12-16, 2018, 5 pages.
Huawei et al., "Discussion on cell measurement for mobility management in NTN", 3GPP TSG RAN WG1 Meeting #96bis, R1-1904002, Xi'an, China, Apr. 8-12, 2019, 4 pages.
3GPP TR 38.821 V0.5.0 (Apr. 2019), 3rd Generation Partnership Project; Technical Specification Group Radio Access Network; Solutions for NR to support non-terrestrial networks (NTN) (Release 16), 58 pages.
3GPP TSG-RAN WG2 Meeting #107, R2-1911297,"Report on email discussion [106#74][NTN] Cell Selection and reselection", LG Electronics Inc., Aug. 26-Aug. 30, 2019, XP051769054, total 16 pages.

* cited by examiner

COMMUNICATION METHOD, DEVICE, AND SYSTEM

CROSS-REFERENCE TO RELATED APPLICATIONS

This application is a continuation of International Application No. PCT/CN2019/109231, filed on Sep. 29, 2019, the disclosure of which is hereby incorporated by reference in its entirety.

TECHNICAL FIELD

This application relates to the communication field, and in particular, to a communication method, device, and system.

BACKGROUND

A conventional terrestrial network (TN) cannot provide seamless coverage, especially in a place in which a base station cannot be deployed, such as a sea, a desert, or the air. Therefore, a non-terrestrial network (NTN) is introduced into a communication system. The NTN is a network in which functions or some functions of a base station are deployed on a high-altitude platform or a satellite to provide seamless coverage for a terminal device.

A coverage area provided by the functions or some functions of the base station that are deployed on the high-altitude platform or the satellite may be referred to as an NTN cell. Usually, a coverage area of the NTN cell is large, and the coverage area of the NTN cell may be covered by a plurality of TN cells. The plurality of TN cells may be understood as TN cells neighboring to the NTN, that is, the NTN cell is neighboring to many TN cells. For example, as shown in FIG. 1*a*, an entire coverage area of an NTN cell is covered by a plurality of TN cells. Alternatively, as shown in FIG. 1*b*, a part of a coverage area of an NTN cell is covered by a plurality of TN cells. In this case, when the terminal device camps on the NTN cell, it is usually expected that the terminal device may reselect to a TN cell in a timely manner.

However, because the NTN cell is neighboring to many TN cells, the terminal device needs to measure a large quantity of frequencies when performing cell reselection. Consequently, energy consumption of the terminal device is huge. Therefore, how to reduce energy consumption of the terminal device is an urgent problem to be resolved currently.

SUMMARY

Embodiments of this application provide a communication method, device, and system, to reduce energy consumption of a terminal device.

To achieve the foregoing objective, the following technical solutions are used in the embodiments of this application.

According to a first aspect, a communication method is provided. In this solution, area configuration information is received from a network device, a first sub-area is determined based on the area configuration information, and measurement is finally performed based on information about one or more neighboring frequencies and/or one or more neighboring cells corresponding to the first sub-area. The area configuration information indicates information about a plurality of sub-areas, a geographical area range including the plurality of sub-areas includes a coverage area of a first cell, and the first sub-area is a sub-area in which a terminal device is currently located in the plurality of sub-areas. Based on this solution, the first sub-area in which the terminal device is currently located may be determined based on the area configuration information sent by the network device from the plurality of sub-areas forming the first cell, and then measurement is performed based on the information about the one or more neighboring frequencies and/or the one or more neighboring cells corresponding to the first sub-area. Therefore, energy consumption can be reduced, and reselection can be accelerated.

In some possible designs, that a first sub-area is determined based on the area configuration information includes: Current geographical location information of the terminal device is obtained. The first sub-area is determined based on the current geographical location information of the terminal device and the area configuration information.

In some possible designs, the area configuration information includes center location coordinate information of each of the plurality of sub-areas and area radius information of the sub-area, and the current geographical location information of the terminal device is location coordinate information of a current geographical location of the terminal device.

In some possible designs, the area configuration information includes a user-readable name of each of the plurality of sub-areas, and that a first sub-area is determined based on the area configuration information includes: A sub-area corresponding to a first user-readable name in the area configuration information is determined as the first sub-area, where the first user-readable name is a user-readable name corresponding to a current geographical location of the terminal device.

In some possible designs, information about each neighboring frequency in the information about the one or more neighboring frequencies corresponding to the first sub-area includes an absolute radio frequency channel number ARFCN.

In some possible designs, the information about each neighboring frequency further includes one or more of the following: a physical cell identifier PCI, a synchronization signal block-based measurement timing configuration SMTC, an SMTC start offset, a network identifier corresponding to the ARFCN included in the information about each neighboring frequency, a type identifier corresponding to the ARFCN included in the information about each neighboring frequency, a network identifier corresponding to the PCI, a type identifier corresponding to the PCI, or a priority corresponding to the ARFCN included in the information about each neighboring frequency.

In some possible designs, the communication method further includes: sending a request message to the network device, where the request message carries indication information of the first sub-area, and the request message is used to request the information about the one or more neighboring frequencies corresponding to the first sub-area. Based on this solution, the network device may send only the information about the one or more neighboring frequencies corresponding to the first sub-area, and does not need to send information about a neighboring frequency corresponding to each sub-area. Therefore, transmission overheads can be reduced.

In some possible designs, the indication information is used to determine one or more of the following: a sub-area identifier of the first sub-area, center location coordinates of the first sub-area, or a user-readable name of the first sub-area.

In some possible designs, the indication information is a first preamble, and the first preamble corresponds to the first sub-area; or the indication information is a first preamble and a first access resource, and both the first preamble and the first access resource correspond to the first sub-area. Based on this solution, the information about the one or more neighboring frequencies corresponding to the first sub-area may be implicitly requested from the network device. Compared with a manner in which the identifier of the first sub-area, center location coordinate information of the first sub-area, or the user-readable name of the first sub-area is directly sent, this manner can reduce transmission overheads.

It may be understood that the method and various possible designs in the first aspect may be implemented by the terminal device, or may be implemented by a component (for example, a chip or a circuit) that can be disposed in the terminal device.

According to a second aspect, a communication method is provided. In this solution, a plurality of sub-areas are determined, where a geographical area range including the plurality of sub-areas includes a coverage area of a first cell; and area configuration information is sent to a terminal device, where the area configuration information indicates information about the plurality of sub-areas. For a technical effect brought by the second aspect, refer to the technical effect brought by the first aspect. Details are not described herein again.

In some possible designs, the area configuration information includes center location coordinate information of each of the plurality of sub-areas and area radius information of the sub-area.

In some possible designs, the area configuration information includes a user-readable name of each of the plurality of sub-areas.

In some possible designs, the area configuration information includes center location coordinate information of each of the plurality of sub-areas, area radius information of the sub-area, and a user-readable name of the sub-area.

In some possible designs, the area configuration information further includes an area identifier of the sub-area.

In some possible designs, the communication method further includes: sending information about one or more neighboring frequencies corresponding to a first sub-area to the terminal device, where the first sub-area is a sub-area in the plurality of sub-areas.

In some possible designs, the communication method further includes: receiving a request message from the terminal device, where the request message carries indication information of the first sub-area, and the request message is used to request the information about the one or more neighboring frequencies corresponding to the first sub-area. Based on this solution, only the information about the one or more neighboring frequencies corresponding to the first sub-area may be sent to the terminal device, and information about a neighboring frequency corresponding to each sub-area does not need to be sent. Therefore, transmission overheads can be reduced.

In some possible designs, the indication information is used to determine one or more of the following: a sub-area identifier of the first sub-area, center location coordinates of the first sub-area, or a user-readable name of the first sub-area.

In some possible designs, the indication information is a first preamble, and the first preamble corresponds to the first sub-area; or the indication information is a first preamble and a first access resource, and both the first preamble and the first access resource correspond to the first sub-area. Based on this solution, the terminal device may implicitly request the information about the one or more neighboring frequencies corresponding to the first sub-area. Compared with a manner in which the identifier of the first sub-area, center location coordinate information of the first sub-area, or the user-readable name of the first sub-area is directly sent, this manner can reduce transmission overheads.

In some possible designs, information about each neighboring frequency in the information about the one or more neighboring frequencies corresponding to the first sub-area includes an absolute radio frequency channel number ARFCN.

In some possible designs, the information about each neighboring frequency further includes one or more of the following: a physical cell identifier PCI, a synchronization signal block-based measurement timing configuration SMTC, an SMTC start offset, a network identifier corresponding to the ARFCN included in the information about each neighboring frequency, a type identifier corresponding to the ARFCN included in the information about each neighboring frequency, a network identifier corresponding to the PCI, a type identifier corresponding to the PCI, or a priority corresponding to the ARFCN included in the information about each neighboring frequency.

It may be understood that the method and various possible designs in the second aspect may be implemented by a network device, or may be implemented by a component (for example, a chip or a circuit) that can be disposed in the network device.

According to a third aspect, a communication method is provided. In this solution, first configuration information is received from a network device, where the first configuration information is used to deactivate measurement on a first neighboring cell, and the first neighboring cell includes at least one neighboring cell of a first cell; and measurement on the first neighboring cell is stopped, a priority of the first neighboring cell is decreased, or the first neighboring cell is deleted based on the first configuration information. Based on this solution, the measurement on the first neighboring cell may be stopped, the priority of the first neighboring cell may be decreased, or the first neighboring cell may be deleted based on the first configuration information sent by the network device. Therefore, when quality of the first neighboring cell is poor, compared with a solution in which the first neighboring cell is frequently measured in a conventional technology, this solution can reduce a quantity of times of measurement on the first neighboring cell, thereby reducing energy consumption and accelerating reselection.

In some possible designs, the first configuration information includes information about a timer. That measurement on the first neighboring cell is stopped, a priority of the first neighboring cell is decreased, or the first neighboring cell is deleted based on the first configuration information includes: The timer is started, and within running time of the timer, measurement on the first neighboring cell is stopped, the priority of the first neighboring cell is decreased, or the first neighboring cell is deleted.

In some possible designs, the first configuration information further includes one or more of the following: a quantity N of times of measurement, a signal quality threshold, or a signal quality difference threshold, where N is a positive integer.

In some possible designs, that the timer is started includes: The timer is started if the first neighboring cell is not measured for N consecutive times; the timer is started if signal quality of the first neighboring cell measured for N consecutive times is lower than the signal quality threshold; the timer is started if signal quality of the first neighboring cell measured for N consecutive times is lower than the signal quality threshold, and a difference between signal quality of the first neighboring cell measured for an $i^{th}$ time and signal quality of the first neighboring cell measured for an $(i-1)^{th}$ time meets the signal quality difference threshold, where i is a positive integer, and a value of i ranges from 2 to N; or the timer is started if signal quality of the first neighboring cell measured for N consecutive times is lower than the signal quality threshold, and a difference between a first signal quality difference and a second signal quality difference meets the signal quality difference threshold, where the first signal quality difference is a difference between signal quality of the first neighboring cell measured for an $i^{th}$ time and signal quality of a serving cell obtained when measurement is performed for the $i^{th}$ time, and the second signal quality difference is a difference between signal quality of the first neighboring cell measured for an $(i-1)^{th}$ time and signal quality of the serving cell obtained when measurement is performed for the $(i-1)^{th}$ time.

It may be understood that the method and various possible designs in the third aspect may be implemented by a terminal device, or may be implemented by a component (for example, a chip or a circuit) that can be disposed in the terminal device.

According to a fourth aspect, a communication method and a corresponding communication apparatus are provided. In this solution, first configuration information is determined, where the first configuration information is used to deactivate a priority of a first neighboring cell; and the first configuration information is sent to a terminal device. For a technical effect brought by the fourth aspect, refer to the technical effect brought by the third aspect. Details are not described herein again.

In some possible designs, the first configuration information includes information about a timer.

In some possible designs, the first configuration information further includes one or more of the following: a quantity N of times of measurement, a signal quality threshold, or a signal quality difference threshold, where N is a positive integer.

It may be understood that the method and various possible designs in the fourth aspect may be implemented by a network device, or may be implemented by a component (for example, a chip or a circuit) that can be disposed in the network device.

It may be understood that the methods in the first aspect and the third aspect may be separately performed, or may be performed together. When the methods are performed together, in the third aspect, measurement on at least one of the one or more neighboring frequencies corresponding to the first sub-area is stopped, a priority of at least one of the one or more neighboring frequencies corresponding to the first sub-area is decreased, or at least one of the one or more neighboring frequencies corresponding to the first sub-area is deleted based on the first configuration information.

It may be understood that the methods in the second aspect and the fourth aspect may be separately performed, or may be performed together. When the methods are performed together, the first configuration information in the fourth aspect may be used to deactivate measurement on at least one of the one or more neighboring frequencies corresponding to the first sub-area.

According to a fifth aspect, a communication apparatus is provided to implement the foregoing methods. The communication apparatus may be the terminal device in the first aspect or the third aspect, an apparatus including the terminal device, or an apparatus included in the terminal device, for example, a chip. Alternatively, the communication apparatus may be the network device in the second aspect or the fourth aspect, an apparatus including the network device, or an apparatus included in the network device. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a sixth aspect, a communication apparatus is provided, including a memory and at least one processor. The memory is configured to store computer instructions. When the processor executes the instructions, the communication apparatus is enabled to perform the method according to any one of the foregoing aspects. The communication apparatus may be the terminal device in the first aspect or the third aspect, an apparatus including the terminal device, or an apparatus included in the terminal device, for example, a chip. Alternatively, the communication apparatus may be the network device in the second aspect or the fourth aspect, an apparatus including the network device, or an apparatus included in the network device.

According to a seventh aspect, a communication apparatus is provided, including an interface circuit and at least one processor. The interface circuit may be a code/data read/write interface circuit, and the interface circuit is configured to: receive computer-executable instructions (where the computer-executable instructions are stored in a memory, and may be directly read from the memory, or may pass through another component), and transmit the computer-executable instructions to the processor. The processor is configured to run the computer-executable instructions to perform the method according to any one of the foregoing aspects. The communication apparatus may be the terminal device in the first aspect or the third aspect, an apparatus including the terminal device, or an apparatus included in the terminal device, for example, a chip. Alternatively, the communication apparatus may be the network device in the second aspect or the fourth aspect, an apparatus including the network device, or an apparatus included in the network device.

According to an eighth aspect, a communication apparatus is provided, including at least one processor. The processor is configured to: be coupled to a memory, and after reading instructions in the memory, perform the method according to any one of the foregoing aspects according to the instructions. The communication apparatus may be the terminal device in the first aspect or the third aspect, an apparatus including the terminal device, or an apparatus included in the terminal device, for example, a chip. Alternatively, the communication apparatus may be the network device in the second aspect or the fourth aspect, an apparatus including the network device, or an apparatus included in the network device.

According to a ninth aspect, a computer-readable storage medium is provided. The computer-readable storage medium stores instructions. When the instructions are run on a communication apparatus, the communication apparatus is enabled to perform the method according to any one of the foregoing aspects. The communication apparatus may be the terminal device in the first aspect or the third aspect, an apparatus including the terminal device, or an apparatus included in the terminal device, for example, a chip. Alternatively, the communication apparatus may be the network device in the second aspect or the fourth aspect, an apparatus including the network device, or an apparatus included in the network device.

According to a tenth aspect, a computer program product including instructions is provided. When the computer program product runs on a communication apparatus, the communication apparatus is enabled to perform the method according to any one of the foregoing aspects. The communication apparatus may be the terminal device in the first aspect or the third aspect, an apparatus including the terminal device, or an apparatus included in the terminal device, for example, a chip. Alternatively, the communication apparatus may be the network device in the second aspect or the fourth aspect, an apparatus including the network device, or an apparatus included in the network device.

According to an eleventh aspect, a communication apparatus (where for example, the communication apparatus may be a chip or a chip system) is provided. The communication apparatus includes at least one processor, configured to implement a function in any one of the foregoing aspects. In a possible design, the communication apparatus further includes a memory. The memory is configured to store necessary program instructions and/or data. When the communication apparatus is the chip system, the communication apparatus may include a chip, or may include a chip and another discrete component.

For technical effects brought by any one of design manners in the fifth aspect to the eleventh aspect, refer to technical effects brought by different design manners of the first aspect, the second aspect, the third aspect, or the fourth aspect. Details are not described herein again.

According to a twelfth aspect, a communication system is provided. The communication system includes the terminal device in the foregoing aspects and the network device in the foregoing aspects.

DETAILED DESCRIPTION OF ILLUSTRATIVE EMBODIMENTS

For ease of understanding of the technical solutions in embodiments of this application, the following first briefly describes technologies related to this application.

First: Non-Terrestrial Network (NTN) System

The non-terrestrial network system may include a satellite system. Based on a satellite altitude, namely, a satellite orbit altitude, satellite systems may be classified into a high elliptical orbit (HEO) satellite, a geostationary earth orbit (GEO) satellite, a medium earth orbit (MEO) satellite, and a low-earth orbit (LEO) satellite. In addition, the non-terrestrial network system may further include a high altitude platform station (HAPS) communication system. The GEO satellite is also referred to as a stationary satellite, and a moving speed of the GEO satellite is the same as an earth rotation speed. Therefore, the GEO satellite remains in a stationary state relative to the ground, and correspondingly a cell of the GEO satellite is also stationary. The cell of the GEO satellite has a large coverage area. A diameter of the cell is usually 500 km.

The LEO satellite moves quickly relative to the ground at a speed of about 7 km/s. Therefore, a coverage area of a service provided by the LEO satellite also moves accordingly.

Second: Satellite Cell Mapping Mode

The satellite cell mapping mode includes a mapping mode of a terrestrial stationary cell and a mapping mode of a terrestrial mobile cell.

Figure 1A:
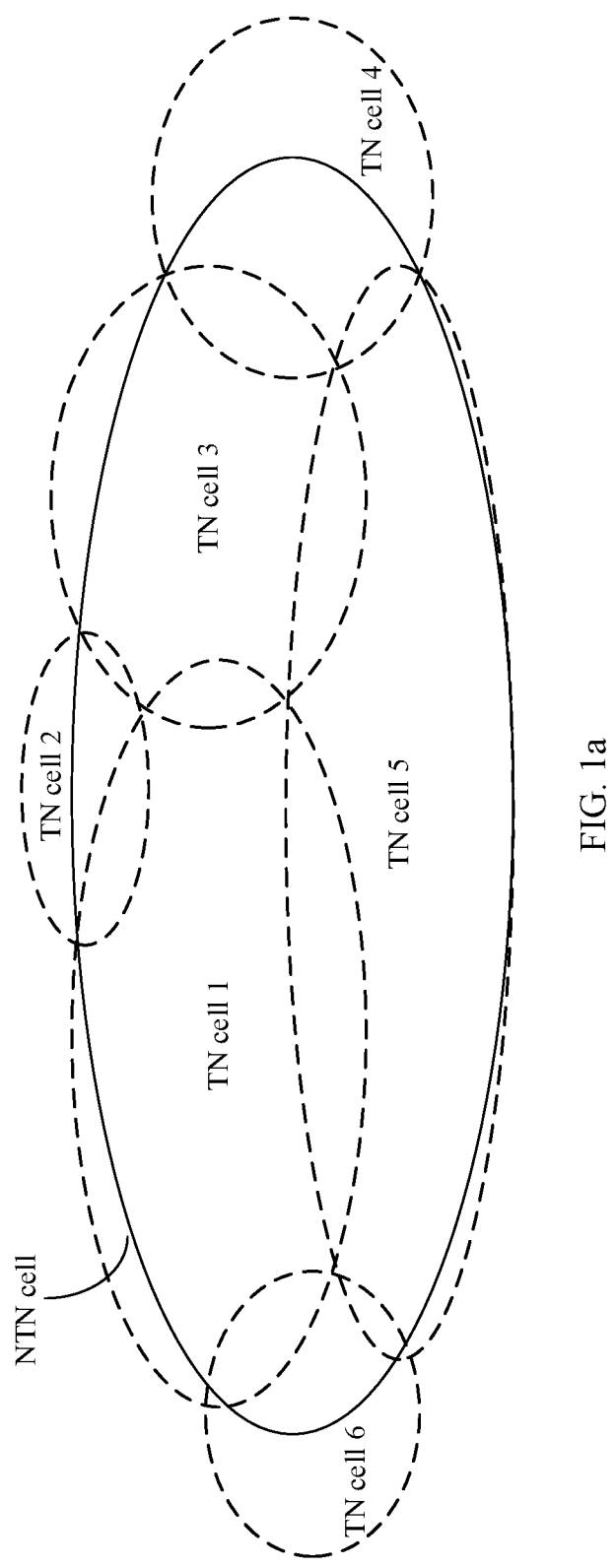
FIG. 1*a* is a schematic diagram in which an entire coverage area of an existing NTN cell is covered by a plurality of TN cells.
Figure 1B:
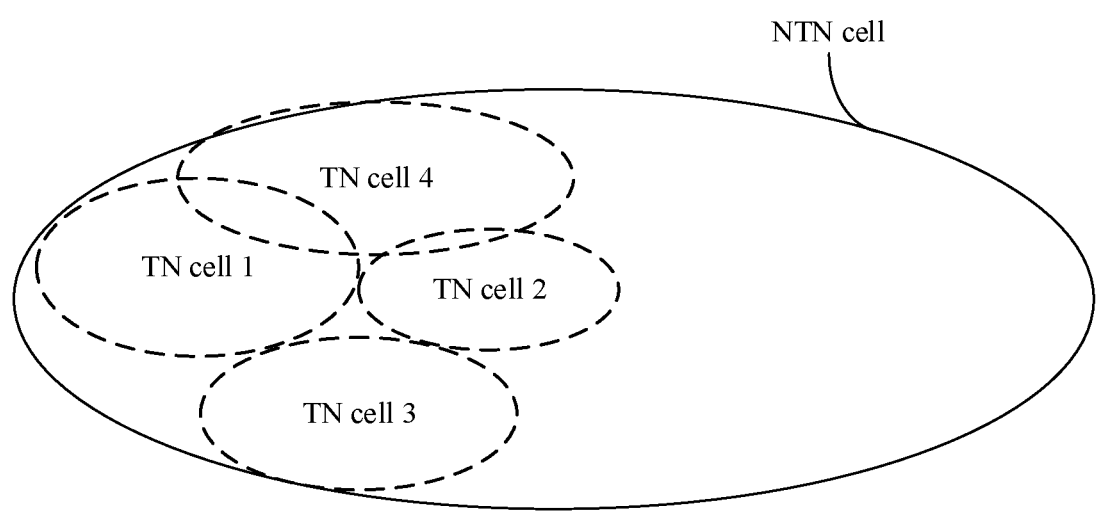
FIG. 1*b* is a schematic diagram in which a part of a coverage area of an existing NTN cell is covered by a plurality of TN cells.
Figure 2A:
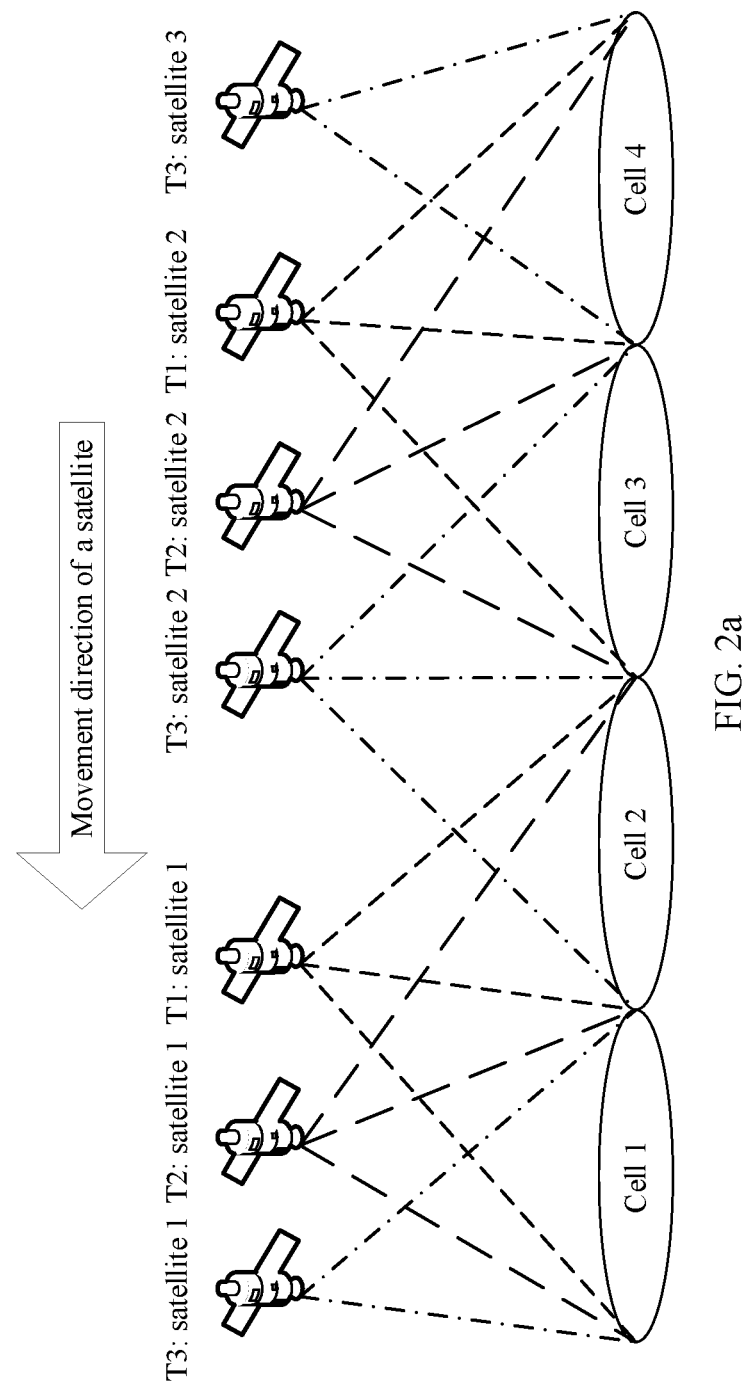
FIG. 2*a* is a schematic diagram of a mapping mode of an existing terrestrial stationary cell.

The mapping mode of the terrestrial stationary cell means that a location of a cell does not move on the ground, and a moving satellite forms these cells by adjusting a beam of the moving satellite. As shown in FIG. 2*a*, at a moment T1, a cell 1 and a cell 2 are covered by a beam of a satellite 1, and a cell 3 and a cell 4 are covered by a beam of a satellite 2. At a moment T2, although both the satellite 1 and the satellite 2 move to the left, beams of the satellite 1 and the satellite 2 can still be adjusted to ensure coverage of the cell 1, the cell 2, the cell 3, and the cell 4. At a moment T3, compared with the moment T1, the satellite 1 and the satellite 2 have moved for a sufficient distance, the satellite 1 cannot provide coverage for the cell 2 by adjusting the beam, and the satellite 2 cannot provide coverage for the cell 4 by adjusting the beam. In this case, the satellite 2 can provide coverage for the cell 2, and the satellite 3 can provide coverage for the cell 4.

Figure 2B:
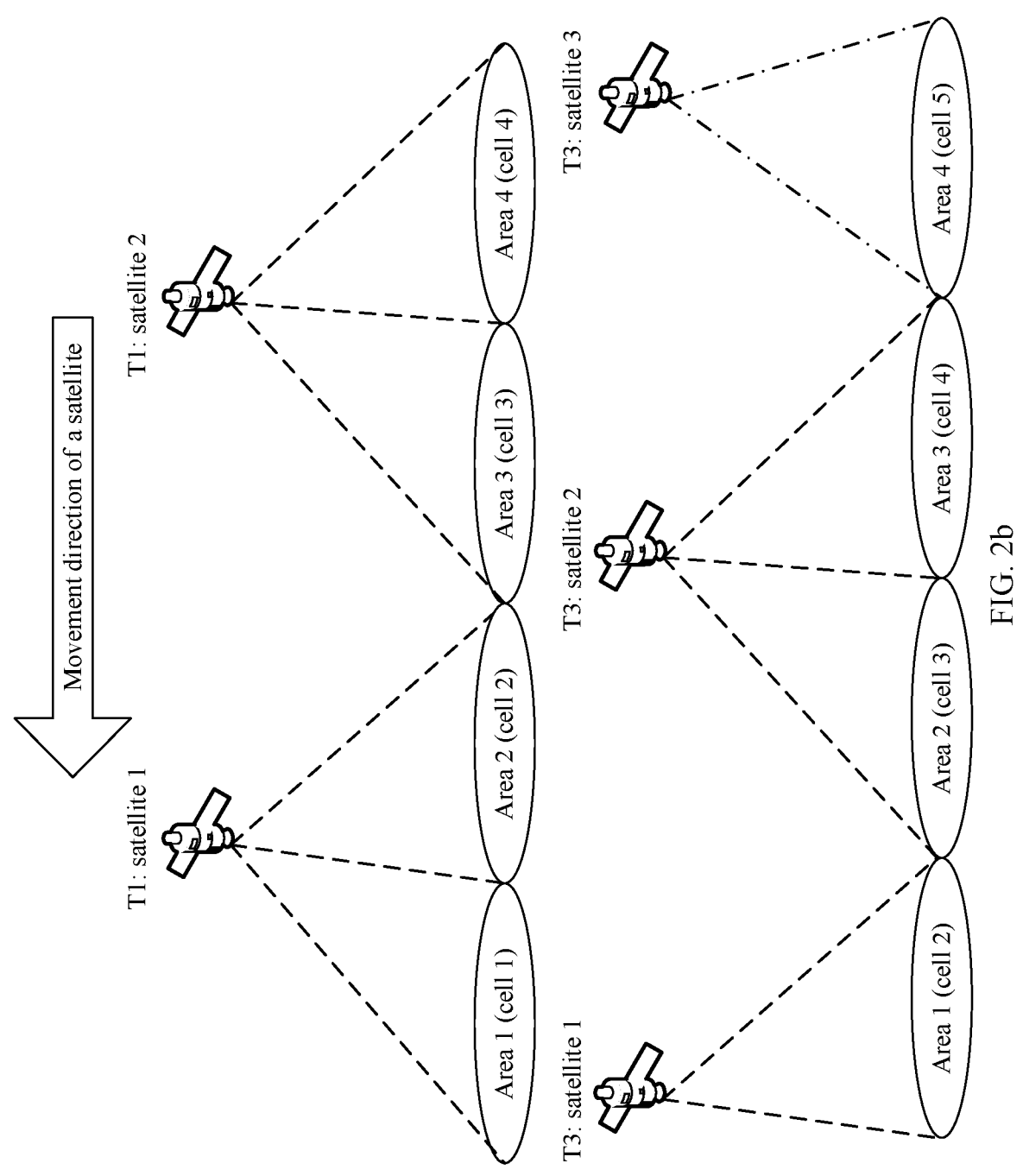
FIG. 2*b* is a schematic diagram of a mapping mode of an existing terrestrial mobile cell.

The mapping mode of the terrestrial mobile cell means that a satellite does not dynamically adjust a beam direction of the satellite, and a cell covered by the satellite moves on the ground as the satellite moves. As shown in FIG. 2*b*, at a moment T1, an area 1, an area 2, an area 3, and an area 4 are respectively covered by a cell 1 and a cell 2 that are formed by a satellite 1 and a cell 3 and a cell 4 that are formed by a satellite 2. At a moment T3, the area 1, the area 2, the area 3, and the area 4 are respectively covered by the cell 2 formed by the satellite 1, the cell 3 and the cell 4 that are formed by the satellite 2, and a cell 5 formed by a satellite 3.

Third: Radio Resource Control (RRC) Status

Figure 3:
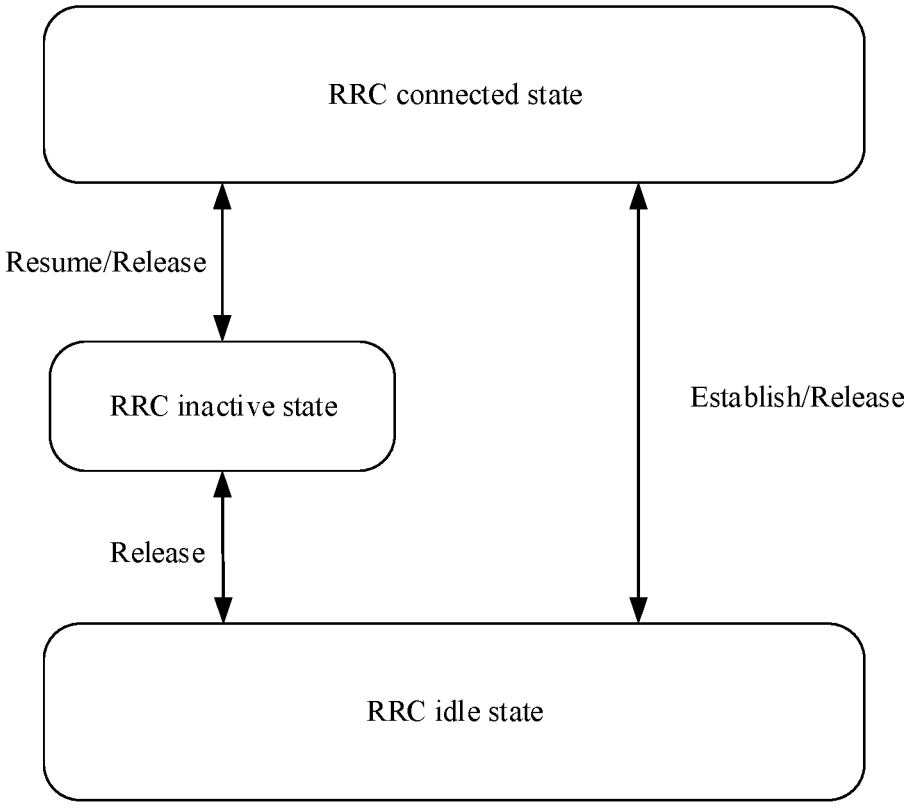
FIG. 3 is a schematic diagram of existing RRC status switching of a terminal device.

A new radio (NR) system is used as an example. In NR, an RRC status of a terminal device includes the following three states: an RRC connected state (RRC_CONNECTED), an RRC inactive state (RRC_INACTIVE), and an RRC idle state (RRC_IDLE). Switching between the three states is that shown in FIG. 3.

When the terminal device is in the RRC connected state, the terminal device has established a connection to each of an access network device and a core network device. When data arrives at a network, the data may be directly transmitted to the terminal device. When the terminal device is in the RRC inactive state, the terminal device established a link to each of an access network device and a core network device, but the link between the terminal device and the access network device is released. In this case, the terminal device and the access network device store a context of the terminal device. When data needs to be transmitted, the access network device can quickly resume the link. When the terminal device is in the RRC idle state, the terminal device does not establish a link to each of an access network device and a core network device. When data needs to be transmitted, a link between the terminal device and the access network device and a link between the access network device and the core network device need to be first established.

It may be understood that the foregoing RRC status is merely an example, and should not constitute any limitation on this application. This application does not exclude that another possible name is defined in a future protocol to replace an existing name but has a same or similar feature, or another status may occur.

The following describes the technical solutions in the embodiments of this application with reference to the accompanying drawings in the embodiments of this application. In the descriptions of this application, "/" represents an "or" relationship between associated objects unless otherwise specified. For example, A/B may represent A or B. The term "and/or" in this application represents only an association relationship for describing associated objects and represents that three relationships may exist. For example, A and/or B may represent the following three cases: Only A exists, both A and B exist, and only B exists, where A and B may be singular or plural. In addition, in the descriptions of this application, unless otherwise specified, "at least one" means one or more, and "a plurality of" means two or more. "At least one item (piece) of the following" or a similar expression thereof means any combination of these items, including any combination of singular items (pieces) or plural items (pieces). For example, at least one (piece) of a, b, or c may represent: a, b, c; a and b; a and c; b and c; or a, b, and c; where a, b, and c may be singular or plural. In addition, to clearly describe the technical solutions in the embodiments of this application, terms such as "first" and "second" are used in the embodiments of this application to distinguish between same items or similar items whose functions and purposes are basically the same. A person skilled in the art may understand that the terms such as "first" and "second" do not limit a quantity and an execution sequence, and the terms such as "first" and "second" do not indicate a definite difference.

The technical solutions in the embodiments of this application may be applied to various communication systems, for example, an orthogonal frequency division multiple access (OFDMA) system, a single carrier frequency division multiple access (SC-FDMA), an NTN system, and another system. Terms "system" and "network" may be interchanged with each other. The OFDMA system may implement wireless technologies such as evolved universal terrestrial radio access (E-UTRA) and ultra mobile broadband (UMB). The E-UTRA is an evolved version of a universal mobile telecommunications system (UMTS). The 3rd generation partnership project (3GPP) uses a new version of E-UTRA in long term evolution (LTE) and various versions based on LTE evolution. A 5th generation (5G) communication system is a next-generation communication system under study. The 5G communication system includes a 5G mobile communication system in non-standalone (NSA) networking, a 5G mobile communication system in standalone (SA) networking, or a 5G mobile communication system in NSA networking and a 5G mobile communication system in SA networking. In addition, the communication systems may be further applied to a future-oriented communication technology, and are all applicable to the technical solutions provided in the embodiments of this application. The foregoing communication systems applicable to this application are merely examples for description, and communication systems applicable to this application are not limited thereto. Generals descriptions are provided herein, and details are not described below.

Figure 4:
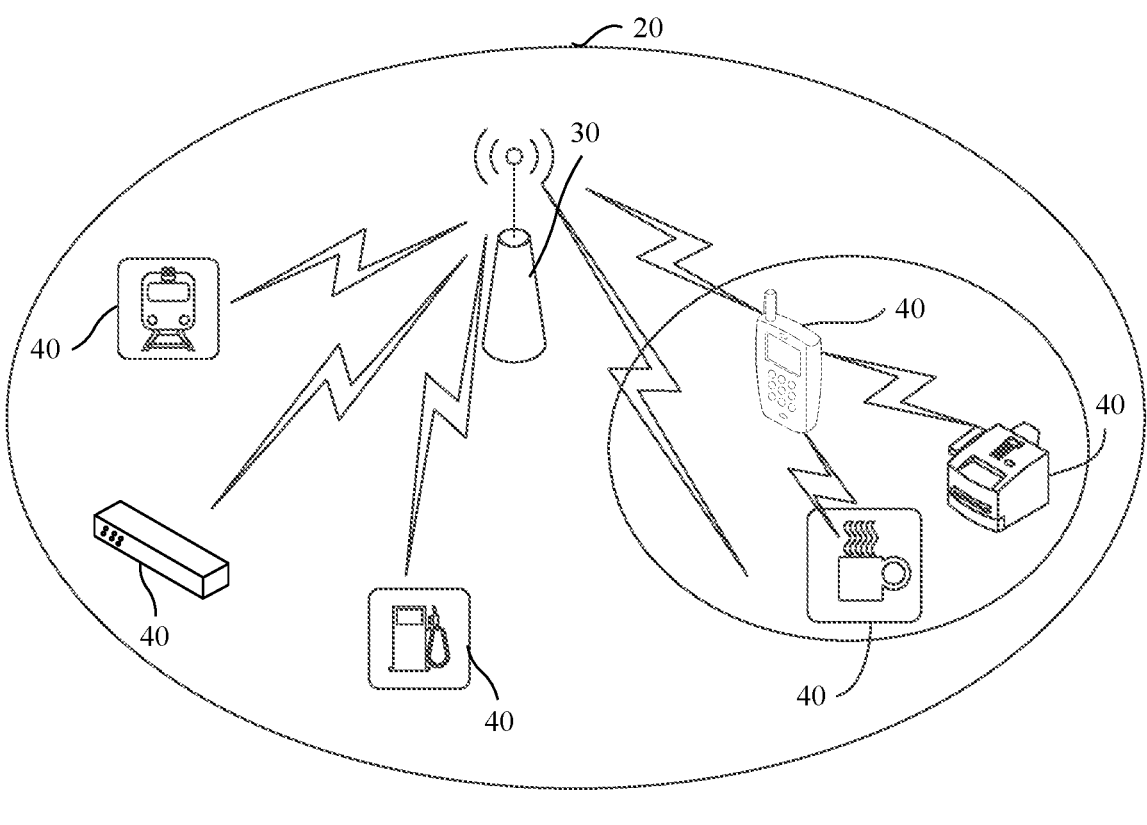
FIG. 4 is a schematic diagram of a structure of a communication system according to an embodiment of this application.

FIG. 4 shows a communication system 10 according to an embodiment of this application. The communication system 10 includes at least one network device 30 and one or more terminal devices 40 connected to the network device 30. Optionally, different terminal devices 40 may communicate with each other.

For example, the network device 30 communicates with any terminal device 40 in FIG. 4. In this embodiment of this application, in a possible implementation, the network device 30 determines a plurality of sub-areas, and sends area configuration information to the terminal device 40. A geographical area range including the plurality of sub-areas includes a coverage area of a first cell, and the area configuration information indicates information about the plurality of sub-areas. Further, the terminal device 40 receives the area configuration information from the network device 30, determines a first sub-area based on the area configuration information, and performs measurement based on information about one or more neighboring frequencies and/or one or more neighboring cells corresponding to the first sub-area. The first sub-area is a sub-area in which the terminal device 40 is currently located in the plurality of sub-areas. Based on this solution, the terminal device may determine, based on the area configuration information sent by the network device from the plurality of sub-areas forming the first cell, the first sub-area in which the terminal device is currently located, and then perform measurement based on the information about the one or more neighboring frequencies and/or the one or more neighboring cells corresponding to the first sub-area. Therefore, energy consumption of the terminal device can be reduced, and reselection performed by the terminal device can be accelerated.

Alternatively, for example, the network device 30 communicates with any terminal device 40 in FIG. 4. In this embodiment of this application, in another possible implementation, the network device 30 sends first configuration information to the terminal device 40. The first configuration information is used to deactivate measurement on a first neighboring cell, and the first neighboring cell includes at least one neighboring cell of a first cell. Further, the terminal device 40 receives the first configuration information from the network device 30, and stops measurement on the first neighboring cell, decreases a priority of the first neighboring cell, or deletes the first neighboring cell based on the first configuration information. Based on this solution, the terminal device may stop measurement on the first neighboring cell, decrease the priority of the first neighboring cell, or delete the first neighboring cell based on the first configuration information sent by the network device. Therefore, when quality of the first neighboring cell is poor or the first neighboring cell cannot be measured, compared with a solution in which the first neighboring cell is frequently measured in a conventional technology, this solution can reduce a quantity of times of measurement on the first neighboring cell, thereby reducing energy consumption of the terminal device and accelerating reselection performed by the terminal device.

Alternatively, for example, the network device 30 communicates with any terminal device 40 in FIG. 4. In this embodiment of this application, the terminal device 40 receives area configuration information from the network device 30, determines a first sub-area based on the area configuration information, and performs measurement based on information about one or more neighboring frequencies and/or one or more neighboring cells corresponding to the first sub-area. In addition, the terminal device 40 further receives first configuration information from the network device 30, where the first configuration information is used to deactivate measurement on at least one neighboring cell of the first sub-area, so that the terminal device 40 stops measurement on the at least one neighboring cell of the first sub-area, decreases a priority of the at least one neighboring cell of the first sub-area, or deletes the at least one neighboring cell of the first sub-area based on the first configuration information. Based on this solution, energy consumption of the terminal device can be further reduced, and reselection performed by the terminal device can be further accelerated.

Optionally, the network device 30 in this embodiment of this application is a device that enables the terminal device 40 to access a wireless network, and may be an evolved NodeB (eNB or eNodeB) in LTE, a base station in a 5G network or a future evolved public land mobile network (PLMN), a broadband network gateway (BNG), an aggregation switch, a non-3rd generation partnership project (3GPP) access device, or the like. This is not specifically limited in this embodiment of this application. Optionally, the base station in this embodiment of this application may include various forms of base stations, for example, a macro base station, a micro base station (also referred to as a small cell), a relay station, an access point, a next generation NodeB (gNB), a home base station (for example, a home evolved NodeB or a home NodeB, HNB), a baseband unit (BBU), a transmission reception point (TRP), a transmission point (TP), and a mobile switching center. This is not specifically limited in this embodiment of this application.

Optionally, the network device 30 in this embodiment of this application may be deployed on a high-altitude platform or a satellite.

In a possible manner, the network device 30 in this embodiment of this application may be a central unit (CU), a distributed unit (DU). Alternatively, the network device may include a CU and a DU. The CU and the DU may be understood as division of the base station from a perspective of logical functions. The CU and the DU may be physically separated, or may be deployed together. This is not specifically limited in this embodiment of this application. The CU and the DU may be connected through an interface, for example, an F1 interface. The CU and the DU may be obtained through division based on protocol layers of a wireless network. For example, functions of a radio resource control (RRC) layer, a service data adaptation protocol (SDAP) layer, and a packet data convergence protocol (PDCP) layer are set in the CU, and functions of a radio link control (RLC) layer, a media access control (MAC) layer, a physical (PHY) layer, and the like are set in the DU. It may be understood that, division into processing functions of the CU and the DU based on the protocol layers is merely an example, and the processing functions of the CU and the DU may alternatively be divided in another manner. This is not specifically limited in this embodiment of this application.

Optionally, the CU may include a CU control plane (CU-CP) and a CU user plane (CU-UP). It may be understood that the CU is divided into the CU-CP and the CU-UP by logical function. The CU-CP and the CU-UP may be obtained through division based on protocol layers of a wireless network. For example, functions of an RRC layer and a PDCP layer corresponding to a signal radio bearer (SRB) are set in the CU-CP, and a function of a PDCP layer corresponding to a data radio bearer (DRB) is set in the CU-UP. In addition, a function of the SDAP layer may also be set in the CU-UP.

Optionally, the terminal device 40 in this embodiment of this application may be a device such as a terminal or a chip that can be used in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved PLMN. An access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

Optionally, the network device 30 and the terminal device 40 in this embodiment of this application may also be referred to as communication apparatuses, and each may be a general-purpose device or a dedicated device. This is not specifically limited in this embodiment of this application.

Figure 5:
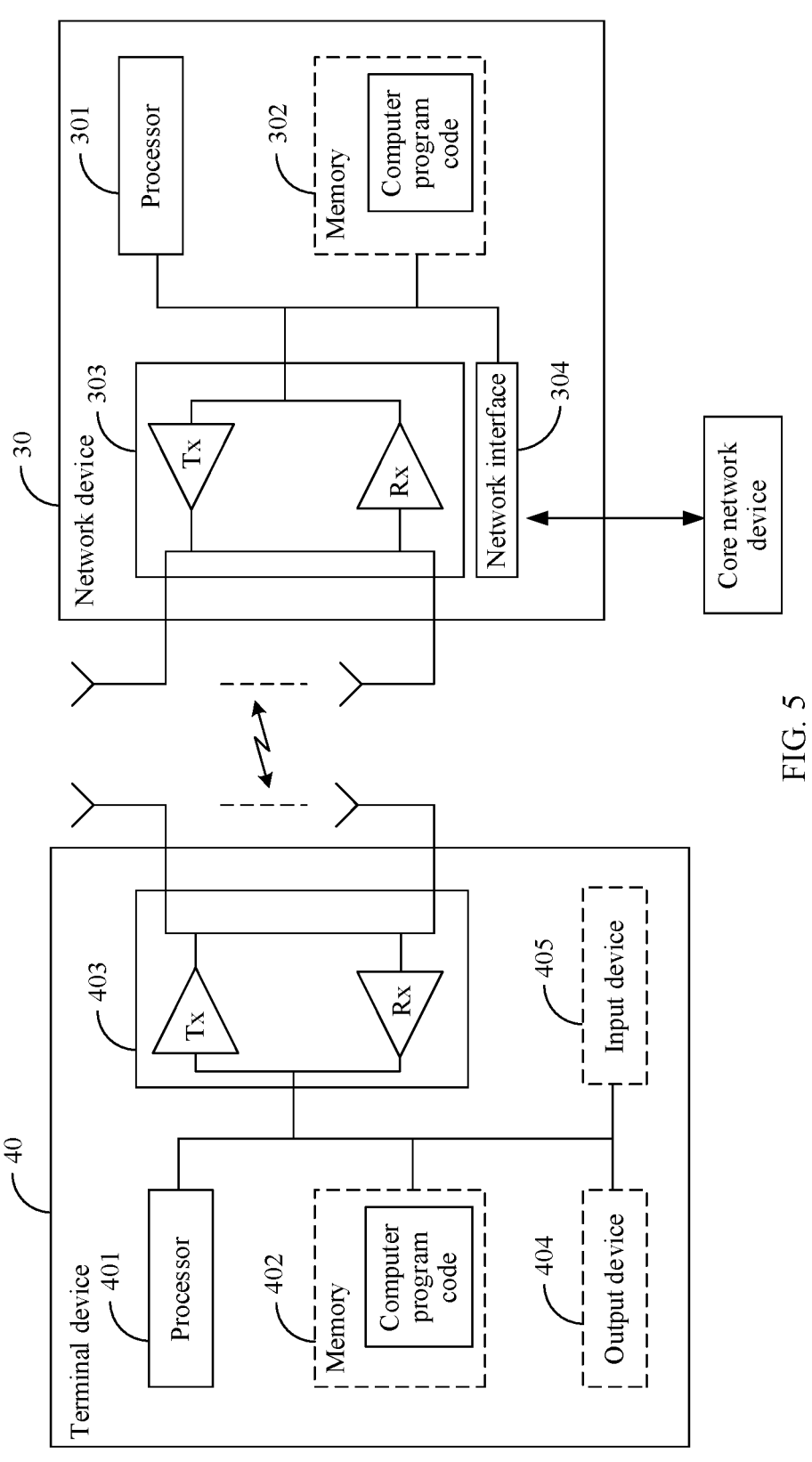
FIG. 5 is a schematic diagram of structures of a terminal device and a network device according to an embodiment of this application.

Optionally, FIG. 5 is a schematic diagram of structures of a network device 30 and a terminal device 40 according to an embodiment of this application.

The terminal device 40 includes at least one processor (an example in which the terminal device 40 includes one processor 401 is used for description in FIG. 5) and at least one transceiver (an example in which the terminal device 40 includes one transceiver 403 is used for description in FIG. 5). Optionally, the terminal device 40 may further include at least one memory (an example in which the terminal device 40 includes one memory 402 is used for description in FIG. 5), at least one output device (an example in which the terminal device 40 includes one output device 404 is used for description in FIG. 5), and at least one input device (an example in which the terminal device 40 includes one input device 405 is used for description in FIG. 5).

The processor 401, the memory 402, and the transceiver 403 are connected through a communication line. The communication line may include a path for transmitting information between the foregoing components.

The processor 401 may be a general-purpose central processing unit (CPU), a microprocessor, an application-specific integrated circuit (ASIC), or one or more integrated circuits configured to control program execution of the solutions in this application. During specific implementation, in an embodiment, the processor 401 may also include a plurality of CPUs, and the processor 401 may be a single-core (single-CPU) processor or a multi-core (multi-CPU) processor. The processor herein may be one or more devices, circuits, or processing cores configured to process data (for example, computer program instructions).

The memory 402 may be an apparatus having a storage function. For example, the memory 402 may be a read-only memory (ROM) or another type of static storage device that can store static information and instructions, or a random access memory (RAM) or another type of dynamic storage device that can store information and instructions. The memory 402 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), or magnetic disk storage medium or another magnetic storage device, or any other medium that can be used to carry or store expected program code in a form of instructions or a data structure and that is accessible to a computer, but is not limited thereto. The memory 402 may exist independently, and is connected to the processor 401 through the communication line. The memory 402 may alternatively be integrated with the processor 401.

The memory 402 is configured to store computer-executable instructions for performing the solutions in this application, and the processor 401 controls execution of the computer-executable instructions. Specifically, the processor 401 is configured to execute the computer-executable instructions stored in the memory 402, to implement the communication method in embodiments of this application. Optionally, the computer-executable instructions in this embodiment of this application may also be referred to as application program code or computer program code. This is not specifically limited in this embodiment of this application.

The transceiver 403 may use any apparatus of a transceiver type, and is configured to communicate with another device or a communication network, for example, the Ethernet, a RAN, or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The network device 30 includes at least one processor (an example in which the network device 30 includes one processor 301 is used for description in FIG. 5), at least one transceiver (an example in which the network device 30 includes one transceiver 303 is used for description in FIG. 5), and at least one network interface (an example in which the network device 30 includes one network interface 304 is used for description in FIG. 5). Optionally, the network device 30 may further include at least one memory (an example in which the network device 30 includes one memory 302 is used for description in FIG. 5). The processor 301, the memory 302, the transceiver 303, and the network interface 304 are connected through a communication line. The network interface 304 is configured to connect to a core network device through a link (for example, an S1 interface), or connect to a network interface of another network device through a wired or wireless link (for example, an X2 interface) (not shown in the FIG. 5). This is not specifically limited in this embodiment of this application. In addition, for descriptions about the processor 301, the memory 302, and the transceiver 303, refer to descriptions about the processor 401, the memory 402, and the transceiver 403 in the terminal device 40. Details are not described again herein.

Figure 6:
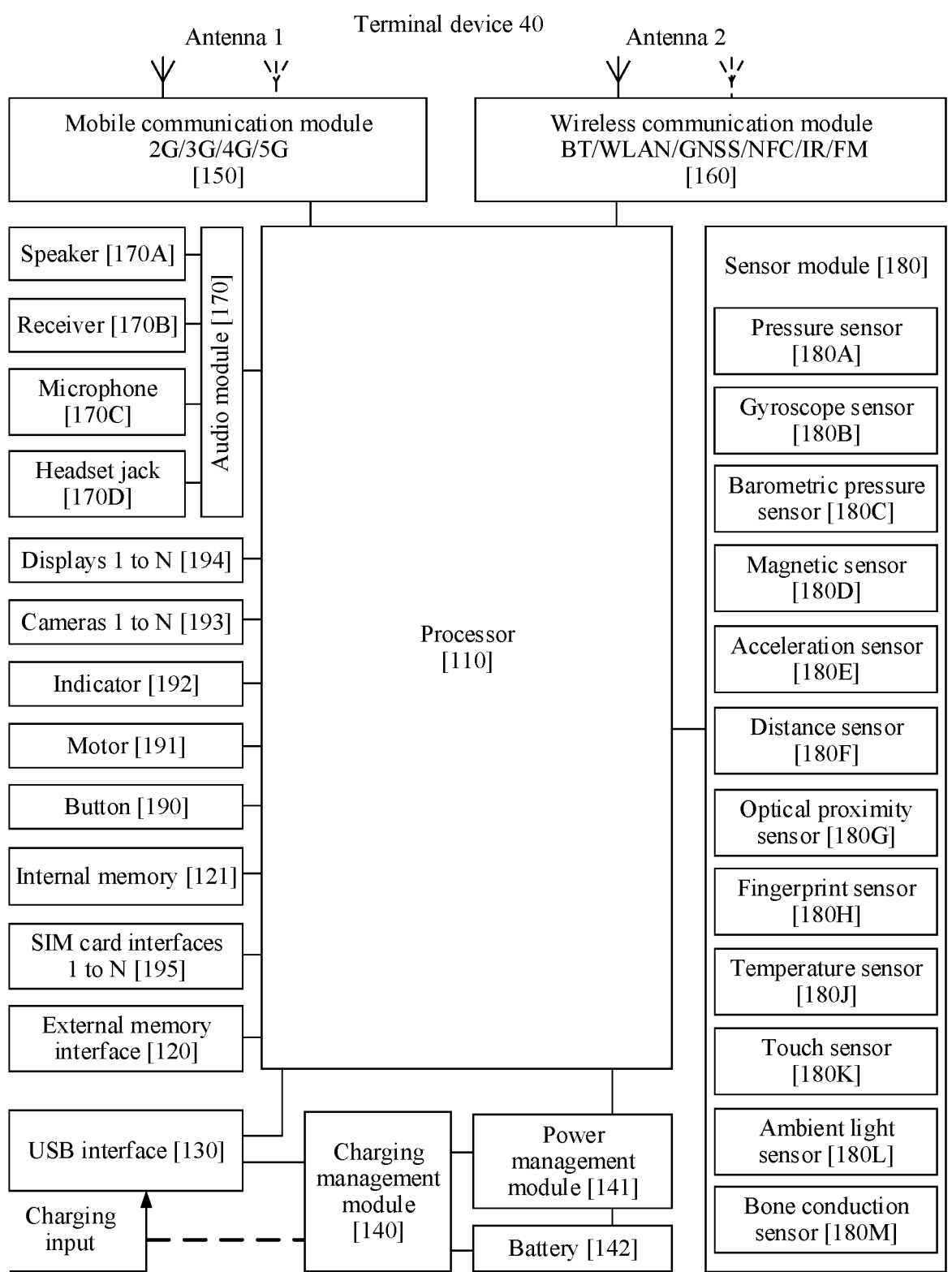
FIG. 6 is a schematic diagram of a structure of another terminal device according to an embodiment of this application.

With reference to the schematic diagram of the structure of the terminal device 40 shown in FIG. 5, for example, FIG. 6 is a specific structural form of the terminal device 40 according to an embodiment of this application.

In some embodiments, a function of the processor 401 in FIG. 5 may be implemented by a processor 110 in FIG. 6.

In some embodiments, a function of the transceiver 403 in FIG. 5 may be implemented by using an antenna 1, an antenna 2, a mobile communication module 150, a wireless communication module 160, and the like in FIG. 6.

The antenna 1 and the antenna 2 are configured to transmit and receive electromagnetic wave signals. Each antenna in the terminal device 40 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution used for wireless communication including 2G, 3G, 4G, 5G, and the like on the terminal device 40. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit a processed electromagnetic wave to a modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in the same device as at least some modules of the processor 110.

The wireless communication module 160 may provide a solution used for wireless communication including a wireless local area network (WLAN) (for example, a Wi-Fi network), Bluetooth (BT), a global navigational satellite system (GNSS), frequency modulation (FM), near field communication (NFC), an infrared (IR) technology, and the like on the terminal device 40. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2. When the terminal device 40 is a first device, that the wireless communication module 160 may provide a solution used for NFC wireless communication on the terminal device 40 means that the first device includes an NFC chip. The NFC chip can improve an NFC wireless communication function. When the terminal device 40 is a second device, that the wireless communication module 160 may provide a solution used for NFC wireless communication on the terminal device 40 means that the first device includes an electronic label (such as a radio frequency identification (RFID) label). If an NFC chip of another device approaches the electronic label, the another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), LTE, BT, a GNSS, a WLAN, NFC, FM, an IR technology, or the like. The GNSS may include a global positioning system (GPS), a global navigation satellite system (GLONASS), a BeiDou navigation satellite system (BDS), a quasi-zenith satellite system (QZSS), or a satellite based augmentation system (SBAS).

In some embodiments, a function of the memory 402 in FIG. 5 may be implemented by using an internal memory 121, an external memory (such as a Micro SD card) connected to an external memory interface 120 in FIG. 6, or the like.

In some embodiments, a function of the output device 404 in FIG. 5 may be implemented by using a display 194 in FIG. 6. The display 194 is configured to display an image, a video, and the like. The display 194 includes a display panel.

In some embodiments, a function of the input device 405 in FIG. 5 may be implemented by using a mouse, a keyboard, a touchscreen device, or a sensor module 180 in FIG. 6. For example, as shown in FIG. 6, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not specifically limited in this embodiment of this application.

In some embodiments, as shown in FIG. 6, the terminal device 40 may further include one or more of an audio module 170, a camera 193, an indicator 192, a motor 191, a button 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "mike" or a "mic"), a headset jack 170D, or the like. This is not specifically limited in this embodiment of this application.

It may be understood that the structure shown in FIG. 6 does not constitute a specific limitation on the terminal device 40. For example, in some other embodiments of this application, the terminal device 40 may include more or fewer components than those shown in the figure, or combine some components, or split some components, or have different component arrangements. The components shown in the figure may be implemented by using hardware, software, or a combination of software and hardware.

With reference to the accompanying drawings, the following describes in detail the communication method provided in embodiments of this application by using an example in which the network device 30 interacts with any terminal devices 40 in FIG. 4.

It may be understood that, in various embodiments of this application, interaction between a network device and a terminal device is also applicable to interaction between a CU and the terminal device, or interaction between a DU and the terminal device. It may be understood that in various embodiments of this application, a mechanism of interaction between the network device and the terminal device may be appropriately modified to be applicable to interaction between the CU or the DU and the terminal device.

It should be noted that names of messages between network elements, names of parameters in the messages, or the like in the following embodiments of this application are merely examples, and there may be other names in a specific implementation. This is not specifically limited in embodiments of this application.

Figure 7A:
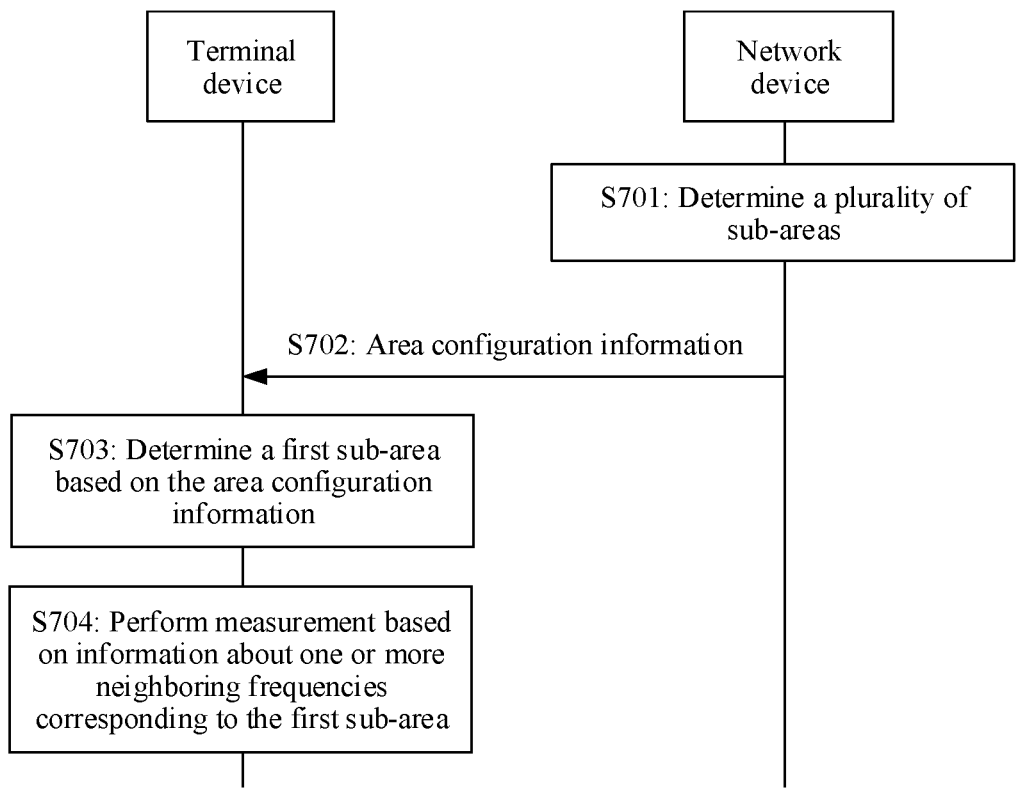
FIG. 7*a* is a schematic flowchart of a communication method according to an embodiment of this application.

FIG. 7*a* shows a communication method according to an embodiment of this application. The communication method includes the following steps.

S701: A network device determines a plurality of sub-areas. The sub-area indicates an actual geographical area range, and a geographical area range including the plurality of sub-areas includes a coverage area of a first cell.

Figure 7B:
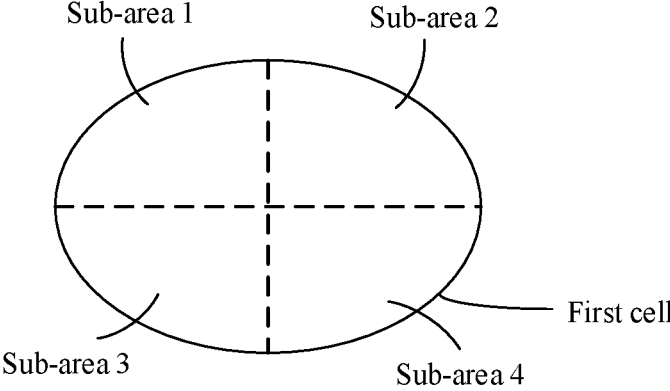
FIG. 7*b* is a schematic diagram of a plurality of sub-areas according to an embodiment of this application.

In a possible implementation, the geographical area range including the plurality of sub-areas is the same as the coverage area of the first cell. In other words, the coverage area of the first cell may be divided into the plurality of sub-areas. As shown in FIG. 7*b*, a solid line indicates the coverage area of the first cell, and a dashed line indicates division of the coverage area of the first cell. The coverage area of the first cell is divided into four sub-areas: a sub-area 1, a sub-area 2, a sub-area 3, and a sub-area 4. It should be noted that FIG. 7*b* is merely an example of a division manner, and there may be another division manner during actual application. For example, the first cell is divided into a plurality of circular areas. A quantity of sub-areas and a division manner of the sub-areas are not specifically limited in this embodiment of this application. It may be understood that a sub-area is not equivalent to a cell. For example, as shown in FIG. 7*b*, it cannot be understood as that the first cell is divided into four cells, but it should be understood as that the coverage area of the first cell may be divided into four geographical area ranges. It may be understood that the sub-area may also be considered as a logical sub-cell.

Figure 7C:
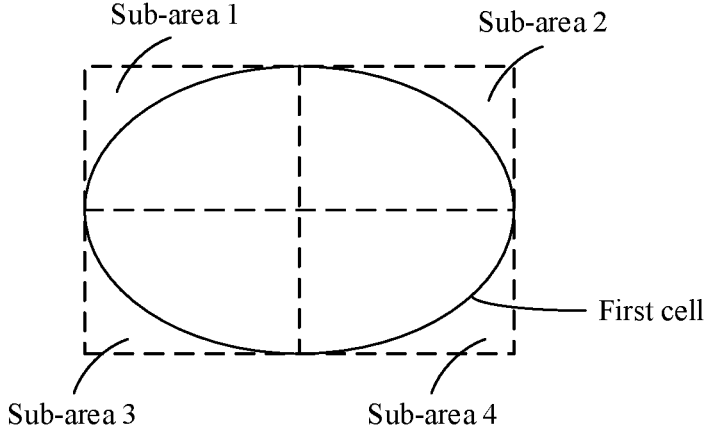
FIG. 7*c* is another schematic diagram of a plurality of sub-areas according to an embodiment of this application.

In another possible implementation, the geographical area range including the plurality of sub-areas may be greater than the coverage area of the first cell. As shown in FIG. 7c, an area formed by solid lines indicates the coverage area of the first cell, four areas formed by dashed lines indicate four sub-areas: a sub-area 1, a sub-area 2, a sub-area 3, and a sub-area 4, and an area range of the four areas is greater than the coverage area of the first cell.

Optionally, in this embodiment of this application, the network device may divide the coverage area of the first cell into a plurality of sub-areas. Alternatively, another network element (for example, an operation, administration and maintenance (OAM) network element) may divide the coverage area of the first cell, and then send information about the plurality of sub-areas to the network device. This is not specifically limited in this embodiment of this application.

Optionally, in this embodiment of this application, within a period of time after the coverage area of the first cell is divided once, a terminal device may perform neighboring frequency measurement or neighboring cell measurement based on the division. In other words, within the period of time, steps S701 and S702 in this embodiment of this application may be performed once, and the following steps S703 and S704 in this embodiment of this application may be performed for a plurality of times.

The first cell is any one of one or more cells served by the network device.

Optionally, area ranges of all the sub-areas in the plurality of sub-areas may not overlap, or may be allowed to overlap. However, an area range of one sub-area cannot completely cover an area range of another sub-area.

It should be noted that, in this embodiment of this application, the first cell may be an NTN cell, or may be a TN cell. This is not specifically limited in this embodiment of this application. Generals descriptions are provided herein, and details are not described in the following embodiments. S702: The network device sends area configuration information to the terminal device. Correspondingly, the terminal device receives the area configuration information from the network device.

The area configuration information indicates information about the plurality of sub-areas.

The first cell is a current serving cell of the terminal device.

Optionally, the network device may send the area configuration information to all terminal devices in the first cell by using a broadcast message; or may separately send the area configuration information to a terminal device in the first cell by using a unicast message; or may send the area configuration information to a group of terminal devices in the first cell by using a multicast message. This is not specifically limited in this embodiment of this application.

Optionally, the network device may include the area configuration information in a system message for sending, or may include the area configuration information in a dedicated RRC message for sending. This is not specifically limited in this embodiment of this application.

Optionally, in different implementations of this embodiment of this application, content of the area configuration information may be different.

In a possible implementation, the area configuration information may include center location coordinate information of each of the plurality of sub-areas and area radius information of the sub-area; the area configuration information may include a user-readable name of each sub-area; or the area configuration information may include center location coordinate information of each sub-area, area radius information of the sub-area, and a user-readable name of the sub-area. In addition, the area configuration information may further include an area identifier of the sub-area. For example, it is assumed that the network device divides the first cell into two sub-areas. When the area configuration information includes center location coordinate information and area radius information of each of the plurality of sub-areas, the area configuration information may be {center location coordinates 1, area radius 1} and {center location coordinates 2, area radius 2}. Alternatively, when the area configuration information includes center location coordinate information, area radius information, and a sub-area identifier of each of the plurality of sub-areas, the area configuration information may be {sub-area 1, center location coordinates 1, area radius 1} and {sub-area 2, center location coordinates 2, area radius 2}.

Optionally, the area configuration information may directly indicate the area identifier of the sub-area. For example, the configuration information is {sub-area 1, center location coordinates 1, area radius 1}. Alternatively, the area configuration information may indirectly indicate the area identifier of the sub-area. For example, a sequence of sub-areas in the area configuration information is area identifiers of the sub-areas. For example, {center location coordinates 1, area radius 1} is information about the 1st sub-area in the area configuration information and may correspond to a sub-area 1, and {center location coordinates 2, area radius 2} is information about the 2nd sub-area in the area configuration information and may correspond to a sub-area 2.

Center location coordinate information of all the sub-areas is different, and area radius information of all the sub-areas may be the same or may be different.

The user-readable name of the sub-area may reflect an area range of the sub-area. For example, the network device divides the first cell into two sub-areas. An area range in which center location coordinates of the 1$^{st}$ sub-area are used as a circle center and an area radius of the 1$^{st}$ sub-area is used as a radius is Huangpu District, Shanghai. In this case, a user-readable name of the 1$^{st}$ sub-area may be Huangpu District, Shanghai. An area range in which a center location of the 2$^{nd}$ sub-area is used as a circle center and an area radius of the 2$^{nd}$ sub-area is used as a radius is Xuhui District, Shanghai. In this case, a user-readable name of the 2$^{nd}$ sub-area may be Xuhui District, Shanghai. Alternatively, the user-readable name of the sub-area may reflect a location in the sub-area. For example, the 1$^{st}$ sub-area is Huangpu District, Shanghai. In this case, the user-readable name of the 1$^{st}$ sub-area may be a name of an iconic building in Huangpu District, Shanghai.

It should be noted that, when determining the plurality of sub-areas, the network device may determine an area range of each sub-area (for example, center location coordinate information and area radius information of each sub-area), but the area configuration information may carry only a user-readable name of the sub-area.

In another possible implementation, the area configuration information may include a length and a width of each of the plurality of sub-areas. In addition, the area configuration information may further include a total quantity of sub-areas in a longitude line direction and a total quantity of sub-areas in a latitude line direction. The total quantity of sub-areas in the longitude line direction is a total quantity of sub-areas in the longitude line direction corresponding to the coverage area of the first cell, and the total quantity of sub-areas in the latitude line direction is a total quantity of sub-areas in the latitude line direction corresponding to the coverage area of the first cell. A product of the total quantity of sub-areas in the longitude line direction and the total quantity of sub-areas in the latitude line direction is a quantity of the plurality of sub-areas forming the coverage area of the first cell in step S701. In this manner, the area configuration information may further include a user-readable name of the sub-area. For descriptions of the user-readable name, refer to the foregoing descriptions. Details are not described herein again.

A length and a width of a same sub-area in the plurality of sub-areas may be the same or may be different. For example, for a sub-area 1 in the plurality of sub-areas, both a length and a width of the sub-area 1 may be 200, or a length and a width of the sub-area 1 may be 200 and 100 respectively. Lengths of different sub-areas may be the same or may be different, and widths of different sub-areas may be the same or may be different. For example, for a sub-area 1 and a sub-area 2 in the plurality of sub-areas, a length and a width of the sub-area 1 may be 200 and 100 respectively, and a length and a width of the sub-area 2 may be 400 and 300 respectively; or a length and a width of the sub-area 1 may be 200 and 100 respectively, and a length and a width of the sub-area 2 may also be 200 and 100 respectively. This is not specifically limited in this embodiment of this application.

S703: The terminal device determines a first sub-area based on the area configuration information.

The first sub-area is a sub-area in which the terminal device is currently located in the plurality of sub-areas.

In a possible implementation, if the terminal device has a positioning function, that the terminal device determines a first sub-area based on the area configuration information may be: The terminal device obtains current geographical location information of the terminal device, and determines the first sub-area based on the current geographical location information of the terminal device and the area configuration information.

Optionally, in this possible implementation, manners in which the terminal device determines the first sub-area based on the current geographical location information of the terminal device and the area configuration information are also different based on different area configuration information. For example, there may be the following two manners:

Manner 1: The area configuration information includes the center location coordinate information of each of the plurality of sub-areas and the area radius information of the sub-area.

In the manner 1, the current geographical location information of the terminal device obtained by the terminal device may be location coordinate information of a current geographical location of the terminal device. The first sub-area is a sub-area whose sub-area radius is less than a first straight-line distance, and the first straight-line distance is a straight-line distance between sub-area center location coordinates corresponding to the sub-area radius and location coordinates of the current geographical location of the terminal device.

For example, the terminal device may separately calculate a straight-line distance corresponding to each sub-area, and then compare the straight-line distance corresponding to each sub-area with an area radius corresponding to the sub-area. If a straight-line distance corresponding to a sub-area is less than an area radius corresponding to the sub-area, the terminal device determines the sub-area as the first sub-area. The straight-line distance corresponding to each sub-area is a straight-line distance between the location coordinates of the current geographical location of the terminal device and center location coordinates of each sub-area.

Optionally, if a straight-line distance corresponding to more than one sub-area is less than an area radius corresponding to the sub-area, a sub-area with a smallest difference between a straight-line distance corresponding to the sub-area and an area radius corresponding to the sub-area is determined as the first sub-area.

For example, the network device divides the first cell into two sub-areas, the area configuration information includes {center location coordinates 1, area radius 1} and {center location coordinates 2, area radius 2}, the location coordinates of the current geographical location of the terminal device are location coordinates 0, a straight-line distance, between the center location coordinates 1 and the location coordinates 0, that is calculated by the terminal device is a distance 1, and a straight-line distance, between the center location coordinates 2 and the location coordinates 0, that is calculated by the terminal device is a distance 2. If the distance 1 is greater than the area radius 1, and the distance 2 is less than the area radius 2, the terminal device determines a sub-area corresponding to {center location coordinates 2, area radius 2} as the first sub-area; or if the distance 1 is less than the area radius 1, and the distance 2 is greater than the area radius 2, the terminal device determines a sub-area corresponding to {center location coordinates 1, area radius 1} as the first sub-area. If the distance 1 is less than the area radius 1, and the distance 2 is also less than the area radius 2, the terminal device calculates a difference between the distance 1 and the area radius 1 and a difference between the distance 2 and the area radius 2. If the difference between the distance 1 and the area radius 1 is less than the difference between the distance 2 and the area radius 2, the terminal device determines a sub-area corresponding to {center location coordinates 1, area radius 1} as the first sub-area.

Manner 2: The area configuration information includes a length of each of the plurality of sub-areas and a width of the sub-area. Further, the area configuration information further includes a total quantity of sub-areas in a longitude line direction and a total quantity of sub-areas in a latitude line direction.

In this embodiment of this application, an example in which different sub-areas in the plurality of sub-areas have a same length and a same width is used for description.

Optionally, the area configuration information may further include an area identifier of the sub-area.

In the manner 2, the current geographical location information of the terminal device obtained by the terminal device may be location coordinates (x, y) of a current geographical location of the terminal device. x is a distance from the terminal device to a relative reference point of a positioning system used by the terminal device in a longitude direction, and Y is a distance from the terminal device to the relative reference point of the positioning system in a latitude direction.

Optionally, the positioning system used by the terminal device may be, for example, a global positioning system (GPS), a BeiDou satellite system, or another positioning system. The relative reference point of the positioning system may vary with different positioning systems, for example, may be (0, 0) or another value. This is not specifically limited in this embodiment of this application.

In the manner 2, that the terminal device determines the first sub-area based on the current geographical location information of the terminal device and the area configuration information may be: The terminal device determines a location of the terminal device in the longitude direction based on the distance of the terminal device in the longitude direction, the length of each sub-area, and the total quantity of sub-areas in the longitude line direction, determines a location of the terminal device in the latitude direction based on the distance of the terminal device in the latitude direction, the width of each sub-area, and the total quantity of sub-areas in the latitude line direction, and then determines a sub-area identifier based on the location in the longitude direction and the location in the latitude direction, where a sub-area identified by the sub-area identifier is the first sub-area.

Optionally, the location of the terminal device in the longitude direction may satisfy the following formula (1):

$$x_1 = \lfloor x/L \rfloor \% Nx \quad (1)$$

The location of the terminal device in the latitude direction may satisfy the following formula (2):

$$y_1 = \lfloor y/W \rfloor \% Ny \quad (2)$$

The sub-area identifier may satisfy the following formula (3):

$$zone\_id = y_1 * Nx + x_1 \quad (3)$$

x is the distance from the terminal device to the relative reference point of the positioning system used by the terminal device in the longitude direction, y is the distance from the terminal device to the relative reference point of the positioning system in the latitude direction, L is the length of each sub-area, Nx is the total quantity of sub-areas in the longitude line direction, Ny is the total quantity of sub-areas in the latitude line direction, W is the width of each sub-area, is the location of the terminal device in the longitude direction, is the location of the terminal device in the latitude direction, zone_id is the sub-area identifier determined by the terminal device, and a symbol $\lfloor \ \rfloor$ indicates a floor operation, and a symbol % indicates a modulo operation.

It may be understood that the formula (3) is merely an example, and the sub-area identifier may alternatively be $zone\_id = x_1 * Ny + y_1$.

An example in which the coordinates of the current geographical location of the terminal device are (500, 500), the total quantity of sub-areas in each of the longitude line direction and the latitude line direction is 4 (that is, the first cell is divided into 16 sub-areas), and the length and the width of each sub-area are both 200 is used. The terminal device may determine $x_1=2$ according to the foregoing formula (1), determine $y_1=2$ according to the foregoing formula (2), and determine, according to the foregoing formula (3), that the sub-area identifier is 10. In this case, the terminal device determines a sub-area whose area identifier is 10 in the 16 sub-areas as the first sub-area.

In another possible implementation, if the terminal device does not have a positioning function and the area configuration information includes a user-readable name of each of the plurality of sub-areas, that the terminal device determines the first sub-area based on the area configuration information may be: The terminal device determines a sub-area corresponding to a first user-readable name in the area configuration information as the first sub-area. The first user-readable name is a user-readable name corresponding to a current geographical location of the terminal device.

Optionally, for the terminal device that does not have the positioning function, a user may manually determine the current geographical location of the terminal device. For example, the user may carry the terminal device, and determine a current geographical location of the user as the current geographical location of the terminal device. In addition, the terminal device may request, from the user through a man-machine interaction interface, a user-readable name corresponding to the current geographical location of the terminal device. For example, the terminal device may display a user-readable name of each of a plurality of sub-areas on the man-machine interaction interface, and the user (manually) selects a user-readable name corresponding to the current geographical location of the terminal device from a plurality of user-readable names.

If a user-readable name of the sub-area reflects an area range of the sub-area, the user selects a user-readable name of an area corresponding to the current geographical location of the terminal device. If a user-readable name of the sub-area reflects a location in the sub-area, the user selects a user-readable name corresponding to a location closest to the current geographical location of the terminal device. After the user selects the user-readable name corresponding to the current geographical location, the terminal device determines a sub-area corresponding to the user-readable name as the first sub-area.

For example, the user-readable name of the sub-area reflects the area range of the sub-area, the network device divides the first cell into three sub-areas, and user-readable names of all the sub-areas are respectively {Huangpu District, Shanghai}, {Xuhui District, Shanghai}, and {Pudong District, Shanghai}. In this case, the terminal device may display the user-readable names of the three sub-areas on the man-machine interaction interface. If the user determines that the terminal device is currently located in the Xuhui District, the user selects the Xuhui District, Shanghai through the man-machine interaction interface, and the terminal device further determines a sub-area corresponding to {Xuhui District, Shanghai} as the first sub-area.

For example, the user-readable name of the sub-area reflects the location in the sub-area, the network device divides the first cell into three sub-areas, user-readable names of all the sub-areas are respectively {iconic building 1}, {iconic building 2}, and {iconic building 3}, and the iconic building 1, the iconic building 2, and the iconic building 3 respectively belong to three sub-areas. In this case, the terminal device may display the user-readable names of the three sub-areas on the man-machine interaction interface. If the user determines that the terminal device is currently closest to the iconic building 1, the user selects the iconic building 1 through the man-machine interaction interface, and the terminal device further determines a sub-area corresponding to {iconic building 1} as the first sub-area.

S704: The terminal device performs measurement based on information about one or more neighboring frequencies and/or one or more neighboring cells corresponding to the first sub-area.

Optionally, the information about the one or more neighboring frequencies corresponding to the first sub-area is information about a part of neighboring frequencies in information about a plurality of neighboring frequencies of the first cell, and the information about the one or more neighboring cells corresponding to the first sub-area is information about a part of neighboring cells in information about a plurality of neighboring cells of the first cell.

Information about each neighboring frequency in the information about the one or more neighboring frequencies corresponding to the first sub-area includes an absolute radio frequency channel number (ARFCN), one ARFCN indicates one neighboring frequency of the first cell, and information about each neighboring frequency includes a different ARFCN.

It should be noted that, in this embodiment of this application, the neighboring frequency of the first cell may be at least one of an intra-frequency neighboring frequency, an inter-frequency neighboring frequency, or an inter-RAT/inter-system neighboring frequency. Therefore, information about a neighboring frequency in this embodiment of this application may be at least one of information about an intra-frequency neighboring frequency, information about an inter-frequency neighboring frequency, or information about an inter-RAT/inter-system neighboring frequency. This is not specifically limited in this embodiment of this application. Generals descriptions are provided herein, and details are not described in the following embodiments.

Optionally, the information about each neighboring frequency in the information about the one or more neighboring frequencies corresponding to the first sub-area may further include one or more of the following parameters: a physical cell identifier (PCI), a type identifier corresponding to the PCI, a network identifier corresponding to the PCI, a synchronization signal block (SSB)-based measurement timing configuration (SMTC), an SMTC start offset, a network identifier corresponding to the ARFCN included in the information about each neighboring frequency, a type identifier corresponding to the ARFCN included in the information about each neighboring frequency, or a priority corresponding to the ARFCN included in the information about each neighboring frequency.

Type information is used to indicate a cell type, for example, an NTN cell or a TN cell. Optionally, a type identifier indicating the NTN cell may be a GEO, an MEO, an LEO, an HAPS, or the like. The network identifier may be a non-public network identifier (NPN ID) or a public network identifier. A private network is a concept relative to a public network, and may be understood as a secret network, for example, an internal network built by a company, a school, or a factory. The private network may also be referred to as a non-public network (NPN). A terminal device that does not subscribe to the private network is not allowed to access the private network. The non-public network identifier may include a standalone non-public network (SNPN) identifier and a closed access group (CAG) identifier. Generally, a private network type may be identified by using a non-public network identifier. Different terminal devices support different non-public network identifiers. The terminal device can camp on only a private network corresponding to a non-public network identifier supported by the terminal device, and can initiate a service on only a private network corresponding to an identifier of a private network to which the terminal device subscribes.

The SSB may also be understood as a synchronization signal/physical broadcast channel block (SS/PBCH block). The SMTC may include, for example, one or more of a periodicity, duration, and an offset for receiving an SS/PBCH block by the terminal device. A periodicity of the SMTC is used to determine a start frame for receiving the SS/PBCH block, the SMTC start offset is used to determine a start location of the start frame, and an SMTC offset is used to determine an offset location relative to the start location.

Optionally, before performing measurement based on the information about the one or more neighboring frequencies corresponding to the first sub-area, the terminal device may receive the information about the one or more neighboring frequencies corresponding to the first sub-area from the network device.

In a possible implementation, after determining the first sub-area, the terminal device sends, to the network device, a request message used to request the information about the one or more neighboring frequencies corresponding to the first sub-area. The request message carries indication information of the first sub-area, and the indication information is used to determine one or more of the following: a sub-area identifier of the first sub-area, center location coordinates of the first sub-area, or a user-readable name of the first sub-area. After receiving the request message, the network device sends the information about the one or more neighboring frequencies corresponding to the first sub-area to the terminal device.

Optionally, the network device may send the information about the one or more neighboring frequencies corresponding to the first sub-area to the terminal device by using a system message or a dedicated RRC message.

Optionally, the indication information may include one or more of the sub-area identifier of the first sub-area, center location coordinate information of the first sub-area, or the user-readable name of the first sub-area.

Alternatively, optionally, the indication information may be bitmap information, that is, the terminal device may indicate the first sub-area by using the bitmap information. For example, if the network device divides the first cell into three sub-areas, the bitmap information may be three bits. In a possible correspondence manner, the $1^{st}$ bit corresponds to the $1^{st}$ sub-area in the three sub-areas, the $2^{nd}$ bit corresponds to the $2^{nd}$ sub-area in the three sub-areas, and the $3^{rd}$ bit corresponds to the $3^{rd}$ sub-area in the three sub-areas. If the first sub-area determined by the terminal device is the $2^{nd}$ sub-area in the three sub-areas, the bitmap information may be 010. After receiving the bitmap information, the network device may determine that the terminal device requests information about one or more neighboring frequencies corresponding to the $2^{nd}$ sub-area in the three sub-areas, and then send the information about the one or more neighboring frequencies corresponding to the $2^{nd}$ sub-area to the terminal device. It may be understood that an $n^{th}$ sub-area may be determined based on a sequence of sub-areas in the area configuration information, or may be a sub-area corresponding to a sub-area identifier in the area configuration information.

Alternatively, optionally, the indication information may be a first preamble and a first access resource, both the first preamble and the first access resource correspond to the first sub-area, and the first access resource is a physical time-frequency resource used to send the first preamble. In this case, the terminal device may first receive a correspondence among the first preamble, the first access resource, and the first sub-area from the network device. The terminal device may send the first preamble on the first access resource to request the information about the one or more neighboring frequencies corresponding to the first sub-area. After receiving the first preamble on the first access resource, the network device sends the information about the one or more neighboring frequencies corresponding to the first sub-area to the terminal device. Specifically, the network device may determine, based on the correspondence among the first preamble, the first access resource, and the first sub-area, that the terminal device requests the information about the one or more neighboring frequencies corresponding to the first sub-area, and then send the information about the one or more neighboring frequencies corresponding to the first sub-area to the terminal device. It should be noted that, when the network device receives the first preamble on an access resource other than the first access resource, the network device performs other processing, for example, random access-related processing. For details, refer to a conventional technology. Details are not described herein.

Alternatively, optionally, the indication information may be bitmap information, that is, the terminal device may indicate the first sub-area by using the bitmap information. For example, if the network device divides the first cell into three sub-areas, the bitmap information may be three bits. In a possible correspondence manner, the 1st bit corresponds to the 1st sub-area in the three sub-areas, the 2nd bit corresponds to the 2nd sub-area in the three sub-areas, and the 3rd bit corresponds to the 3rd sub-area in the three sub-areas. If the first sub-area determined by the terminal device is the 2nd sub-area in the three sub-areas, the bitmap information may be 010. After receiving the bitmap information, the network device may determine that the terminal device requests information about one or more neighboring frequencies corresponding to the 2nd sub-area in the three sub-areas, and then send the information about the one or more neighboring frequencies corresponding to the 2nd sub-area to the terminal device. It may be understood that an nth sub-area may be determined based on a sequence of sub-areas in the area configuration information, or may be a sub-area corresponding to a sub-area identifier in the area configuration information.

In another possible implementation, the terminal device may send, to the network device, a request message used to request information about one or more neighboring frequencies corresponding to each sub-area in all sub-areas. After receiving the request message, the network device sends the information about the one or more neighboring frequencies corresponding to each sub-area to the terminal device. The terminal device determines, from the information about the one or more neighboring frequencies corresponding to each sub-area, the information about the one or more neighboring frequencies corresponding to the first sub-area based on the center location coordinate information, the sub-area identifier, or the user-readable name of the first sub-area.

Optionally, the network device may send a correspondence between a second preamble and a first system message to the terminal device. When the terminal device needs to request the information about the one or more neighboring frequencies corresponding to each sub-area in all the sub-areas, the terminal device sends the second preamble. After receiving the second preamble, the network device sends the first system message to the terminal device. The first system message carries the information about the one or more neighboring frequencies corresponding to each sub-area in all the sub-areas.

Alternatively, optionally, the network device may send a correspondence among a second preamble, a second access resource, and a first system message to the terminal device. When the terminal device needs to request the information about the one or more neighboring frequencies corresponding to each sub-area in all the subareas, the terminal device sends the second preamble on the second access resource. After receiving the second preamble on the second access resource, the network device sends the first system message to the terminal device. The first system message carries the information about the one or more neighboring frequencies corresponding to each sub-area in all the sub-areas. It should be noted that, when the network device receives the second preamble on an access resource other than the second access resource, the network device performs other processing, for example, random access-related processing. For details, refer to a conventional technology. Details are not described herein.

It can be learned that the terminal device may explicitly or implicitly request the information about the one or more neighboring frequencies corresponding to the first sub-area from the network device, obtain the information about the one or more neighboring frequencies corresponding to the first sub-area, and directly perform measurement based on the information about the one or more neighboring frequencies corresponding to the first sub-area. Alternatively, the terminal device may request the information about the one or more neighboring frequencies corresponding to each sub-area in all the subareas from the network device, obtain the information about the one or more neighboring frequencies corresponding to each sub-area in all the subareas, determine, based on the center location coordinate information, the sub-area identifier, or the user-readable name of the first sub-area, the information about the one or more neighboring frequencies corresponding to the first sub-area from the information about the one or more neighboring frequencies corresponding to each sub-area, and perform measurement based on the information about the one or more neighboring frequencies corresponding to the first sub-area.

In still another possible implementation, the terminal device does not need to send a request message to the network device, and the network device actively sends the information about the one or more neighboring frequencies corresponding to each of the plurality of sub-areas to the terminal device. The network device may include the information about the one or more neighboring frequencies corresponding to each sub-area and the area configuration information in a same message and send the same message to the terminal device, or may include the information about the one or more neighboring frequencies corresponding to each sub-area and the area configuration information in different messages and send the different messages to the terminal device. This is not specifically limited in this embodiment of this application.

Optionally, for example, that the terminal device performs measurement based on the information about the one or more neighboring frequencies corresponding to the first sub-area may be: The terminal device separately measures a frequency indicated by the ARFCN included in the information about each neighboring frequency. A specific measurement manner is not limited in this embodiment of this application, and details are not described herein.

It should be noted that in step S704 in this embodiment of this application, an implementation in which the terminal device performs measurement based on the information about the one or more neighboring cells corresponding to the first sub-area is similar to an implementation in which the terminal device performs measurement based on the information about the one or more neighboring frequencies corresponding to the first sub-area. The descriptions of the information about the one or more neighboring frequencies corresponding to the first sub-area in step S704 may be cited to the one or more neighboring cells corresponding to the first sub-area. For details, refer to the foregoing related descriptions. Details are not described herein again.

According to the communication method provided in this embodiment of this application, the terminal device may determine, based on the area configuration information sent by the network device from the plurality of sub-areas forming the first cell, the first sub-area in which the terminal device is currently located, and then perform measurement based on the information about the one or more neighboring frequencies and/or the one or more neighboring cells corresponding to the first sub-area. Therefore, compared with a solution in which measurement needs to be performed based on information about all neighboring frequencies of the first cell in the conventional technology, this solution can reduce energy consumption of the terminal device.

In addition, in an implementation scenario of this embodiment of this application, the network device may be a CU, and a method and/or a step implemented by the network device may be implemented by the CU in this embodiment of this application; the network device may be a DU, and a method and/or a step implemented by the network device may be implemented by the DU in this embodiment of this application; or the network device may include a CU and a DU, and a method and/or a step implemented by the network device may be implemented by the CU and/or the DU in this embodiment of this application.

For example, when the network device is the CU, the CU may determine the plurality of sub-areas in step S701. When the network device is the DU, the DU may determine the plurality of sub-areas in step S701. When the network device includes the CU and the DU, the DU may determine the plurality of sub-areas, or the CU may determine the plurality of sub-areas in step S701. This is not specifically limited in this embodiment of this application.

In a possible implementation, when the DU determines the plurality of sub-areas in step S701, before step S702, the communication method provided in this embodiment of this application may further include: The DU generates the area configuration information. Optionally, the DU may send the area configuration information to the CU. Optionally, before the DU sends the area configuration information to the CU, the CU may request the area configuration information from the DU.

Further, the DU may send the information about the one or more neighboring frequencies and/or the one or more neighboring cells corresponding to each sub-area to the CU. Optionally, before the DU sends the information about the one or more neighboring frequencies and/or the one or more neighboring cells corresponding to each sub-area to the CU, the CU may request the information about the one or more neighboring frequencies and/or the one or more neighboring cells corresponding to each sub-area from the DU.

Optionally, the DU may include the foregoing information in an F1 establishment request message, a gNB-DU configuration update message, or a gNB-CU configuration update acknowledgment message, and send the F1 establishment request message, the gNB-DU configuration update message, or the gNB-CU configuration update acknowledgment message to the CU.

In another possible implementation, when the CU determines the plurality of sub-areas in step S701, before step S702, the communication method provided in this embodiment of this application may further include: The CU generates the area configuration information. Optionally, the CU may send the area configuration information to the DU. Optionally, before the CU sends the area configuration information to the DU, the DU may request the area configuration information from the CU.

Further, the CU may send the information about the one or more neighboring frequencies and/or the one or more neighboring cells corresponding to each sub-area to the DU. Optionally, before the CU sends the information about the one or more neighboring frequencies and/or the one or more neighboring cells corresponding to each sub-area to the DU, the DU may request the information about the one or more neighboring frequencies and/or the one or more neighboring cells corresponding to each sub-area from the CU.

Optionally, the CU may include the foregoing information in an F1 establishment response message, a gNB-CU configuration update message, or a gNB-DU configuration update acknowledgment message, and send the F1 establishment response message, the gNB-DU configuration update message, or the gNB-DU configuration update acknowledgment message to the DU.

It may be understood that in the foregoing two possible cases, in step S702, the CU or the DU may send the area configuration information to the terminal device. Further, in step S704, the CU or the DU may send the information about the one or more neighboring frequencies and/or the one or more neighboring cells corresponding to each sub-area to the terminal device, or the CU or the DU may send the information about the one or more neighboring frequencies and/or the one or more neighboring cells corresponding to the first sub-area to the terminal device.

It may be understood that the foregoing method is applicable to a scenario in which there is an NTN cell, but should not constitute any limitation on this application. This application is further applicable to another scenario, for example, is applicable to a scenario in which there is a cell with a large coverage area.

Figure 8A:
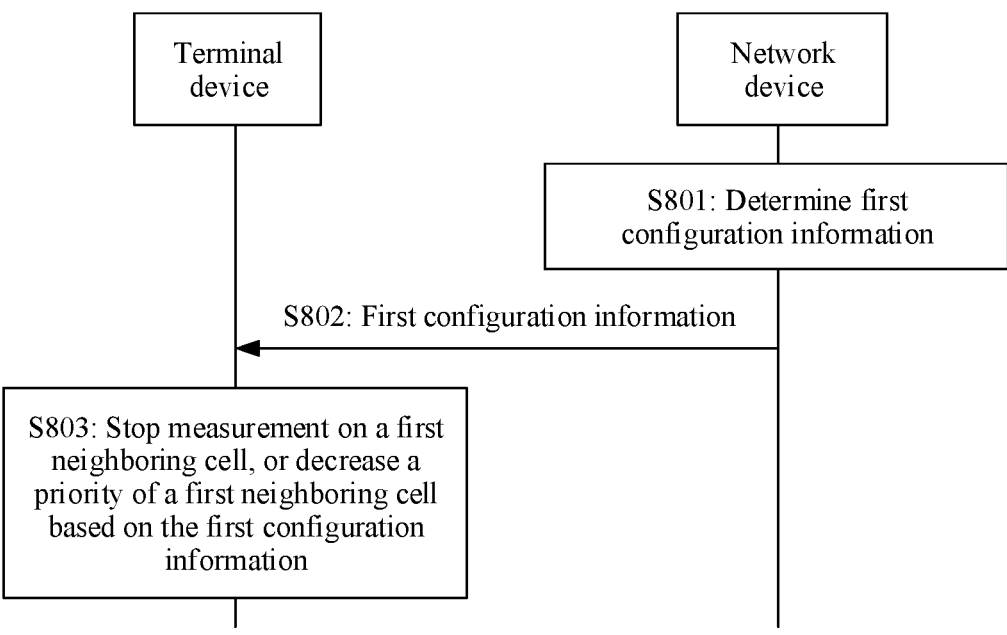
FIG. 8*a* is a schematic flowchart of another communication method according to an embodiment of this application.

The processor 301 in the network device 30 shown in FIG. 5 may invoke application program code stored in the memory 302, to indicate the network device to perform the actions of the network device in steps S701 to S704. The processor 401 in the terminal device 40 shown in FIG. 5 may invoke application program code stored in the memory 402, to indicate the network device to perform the actions of the terminal device in steps S701 to S704. This is not limited in this embodiment. FIG. 8a shows another communication method according to an embodiment of this application. The communication method includes the following steps.

S801: A network device determines first configuration information.

The first configuration information is used to deactivate measurement on a first neighboring cell or a first neighboring frequency, the first neighboring cell includes at least one neighboring cell of a first cell, the first neighboring frequency includes at least one neighboring frequency of a frequency corresponding to the first cell, and the first cell is any one of one or more cells served by the network device. That is, in the first configuration information, measurement on the at least one neighboring cell of the first cell may be deactivated by using a cell as a granularity, or measurement on the at least one neighboring frequency of the first cell may be deactivated by using a frequency as a granularity.

It should be noted that, in this embodiment of this application, a priority of each neighboring cell in the first neighboring cell may be higher than a priority of the first cell, may be lower than the priority of the first cell, or may be the same as the priority of the first cell. A priority of each neighboring frequency in the first neighboring frequency may be higher than a priority of the frequency corresponding to the first cell, may be lower than the priority of the frequency corresponding to the first cell, or may be the same as the priority of the frequency corresponding to the first cell. This is not specifically limited in this embodiment of this application.

It should be noted that, in this embodiment of this application, a terminal device may measure the neighboring cell or the neighboring frequency of the first cell in at least one of the following scenarios: The terminal device measures a high-priority neighboring cell or frequency without considering quality of a current serving cell; or the terminal device measures an intra-frequency neighboring cell or frequency, an identical-priority neighboring cell or frequency, or a low-priority neighboring cell or frequency when quality of a current serving cell meets a threshold. In other words, in the at least one of the foregoing scenarios, the terminal device may deactivate measurement on the first neighboring cell or the first neighboring frequency based on the first configuration information.

It should be noted that the first neighboring cell may be an NTN cell, or may be a TN cell, and the first cell may be an NTN cell, or may be a TN cell. This is not specifically limited in this embodiment of this application. Generals descriptions are provided herein, and details are not described in the following embodiments.

S802: The network device sends the first configuration information to the terminal device.

Correspondingly, the terminal device receives the first configuration information from the network device.

The first cell is a current serving cell of the terminal device.

Optionally, the network device may send the first configuration information to all terminal devices in the first cell by using a broadcast message; or may separately send the first configuration information to a terminal device in the first cell by using a unicast message; or may send the first configuration information to a group of terminal devices in the first cell by using a multicast message. This is not specifically limited in this embodiment of this application.

Optionally, the network device may include the first configuration information in a system message for sending, or may include the first configuration information in a dedicated RRC message for sending. This is not specifically limited in this embodiment of this application.

In addition, in an implementation scenario of this embodiment of this application, the network device may be a CU, and a method and/or a step implemented by the network device may be implemented by the CU in this embodiment of this application; the network device may be a DU, and a method and/or a step implemented by the network device may be implemented by the DU in this embodiment of this application; or the network device may include a CU and a DU, and a method and/or a step implemented by the network device may be implemented by the CU and/or the DU in this embodiment of this application.

For example, when the network device is the CU, the CU may determine the first configuration information in step S801. When the network device is the DU, the DU may determine the first configuration information in step S801. When the network device includes the CU and the DU, the DU may determine the first configuration information, or the CU may determine the first configuration information in step S801. This is not specifically limited in this embodiment of this application.

In a possible implementation, when the DU may determine the first configuration information in step S801, optionally, the communication method provided in this embodiment of this application may further include: The DU sends the first configuration information to the CU. Optionally, before the DU sends the first configuration information to the CU, the CU may request the first configuration information from the DU.

Optionally, the DU may include the first configuration information in an F1 establishment request message, a gNB-DU configuration update message, or a gNB-CU configuration update acknowledgment message, and send the F1 establishment request message, the gNB-DU configuration update message, or the gNB-CU configuration update acknowledgment message to the CU.

In another possible implementation, when the CU determines the first configuration information in step S801, optionally, the communication method provided in this embodiment of this application may include: The CU sends the first configuration information to the DU. Optionally, before the CU sends the first configuration information to the DU, the DU may request the first configuration information from the CU.

Optionally, the CU may include the first configuration information in an F1 establishment response message, a gNB-CU configuration update message, or a gNB-DU configuration update acknowledgment message, and send the F1 establishment response message, the gNB-DU configuration update message, or the gNB-DU configuration update acknowledgment message to the DU.

It may be understood that in the foregoing two possible cases, in step S802, the CU or the DU may send the first configuration information to the terminal device.

S803: When the first configuration information is used to deactivate measurement on the first neighboring cell, the terminal device stops measurement on the first neighboring cell, decreases a priority of the first neighboring cell, or deletes the first neighboring cell based on the first configuration information. When the first configuration information is used to deactivate measurement on the first neighboring frequency, the terminal device stops measurement on a first frequency, decreases a priority of the first frequency, or deletes the first frequency based on the first configuration information.

The first neighboring cell is a neighboring cell in the at least one neighboring cell. The first frequency is a frequency in the at least one neighboring frequency.

Optionally, stopping measurement on the first neighboring cell may be understood as that the terminal device does not measure the first neighboring cell, or the terminal device does not measure the first neighboring cell within a period of time.

Optionally, when the priority of the first neighboring cell is higher than the priority of the first cell, decreasing the priority of the first neighboring cell may be: setting the priority of the first neighboring cell to being the same as the priority of the first cell, setting the priority of the first neighboring cell to any priority that is lower than the priority of the first cell, setting the priority of the first neighboring cell to a lowest priority, or decreasing the priority of the first neighboring cell based on a specific delta value. For example, if an initial priority of the first neighboring cell is 1 and a delta value is 2, decreasing the priority of the first neighboring cell may be: setting the priority of the first neighboring cell to 3. When the priority of the first neighboring cell is lower than the priority of the first cell or is the same as the priority of the first cell, decreasing the priority of the first neighboring cell may be: setting the priority of the first neighboring cell to a lowest priority, or decreasing the priority of the first neighboring cell based on a specific delta value.

Optionally, deleting the first neighboring cell may be understood as deleting the first neighboring cell from a measurement target of the first cell. Optionally, the first configuration information may include information about a timer. In this case, that the terminal device stops measurement on the first neighboring cell, decreases a priority of the first neighboring cell, or deletes the first neighboring cell based on the first configuration information may be: The terminal device starts the timer, and within running time of the timer, stops measurement on the first neighboring cell, decreases the priority of the first neighboring cell, or deletes the first neighboring cell.

It may be understood that, after the timer expires, the terminal device may start a new timer, and within re-running time of the new timer, continue to stop measurement on the first neighboring cell, decrease the priority of the first neighboring cell, or delete the first neighboring cell. Alternatively, after the timer expires, the terminal device may continue to measure the first neighboring cell, recover the priority of the first neighboring cell, or add the first neighboring cell to the measurement target of the terminal device again. This is not specifically limited in this embodiment of this application.

It may be understood that for descriptions in which the terminal device stops measurement on the first frequency, decreases the priority of the first frequency, or deletes the first frequency, refer to related descriptions in which the terminal device stops measurement on the first neighboring cell, decreases the priority of the first neighboring cell, or deletes the first neighboring cell. Details are not described herein again.

Further, the first configuration information may further include one or more of the following: a quantity N of times of measurement, measurement duration T, a signal quality threshold, or a signal quality difference threshold. N is a positive integer. In this case, the terminal device may start the timer in the following several cases.

Case 1: The terminal device starts the timer if the terminal device has not measured the first neighboring cell/the first frequency for N consecutive times.

It should be noted that, in this embodiment of this application, N consecutive times may be understood as N consecutive times starting from the 1$^{st}$ time of measurement, or may be understood as N consecutive times starting from a moment. Before the moment, the first neighboring cell/the first frequency may be measured, or the first neighboring cell/the first frequency may not be measured. This is not specifically limited in this embodiment of this application. Generals descriptions are provided herein, and details are not described in the following embodiments.

Case 2: The terminal device starts the timer if signal quality of the first neighboring cell measured by the terminal device for N consecutive times is lower than the signal quality threshold, or signal quality of each of all cells, on the first frequency, measured by the terminal device for N consecutive times is lower than the signal quality threshold.

Case 3: The terminal device starts the timer if signal quality of the first neighboring cell measured by the terminal device for N consecutive times is lower than the signal quality threshold, and a difference between signal quality of the first neighboring cell measured for an i$^{th}$ time and signal quality of the first neighboring cell measured for an (i–1)$^{th}$ time meets the signal quality difference threshold, where i is a positive integer ranging from 2 to N.

That a difference between signal quality of the first neighboring cell measured for an i$^{th}$ time and signal quality of the first neighboring cell measured for an (i–1)$^{th}$ time meets the signal quality difference threshold may be understood as that a value obtained by subtracting the signal quality of the first neighboring cell measured for the (i–1)$^{th}$ time from the signal quality of the first neighboring cell measured for the i$^{th}$ time is less than or equal to the signal quality difference threshold; may be understood as that a value obtained by subtracting the signal quality of the first neighboring cell measured for the i$^{th}$ time from the signal quality of the first neighboring cell measured for the (i–1)$^{th}$ time is greater than or equal to the signal quality difference threshold; or may be understood as that an absolute value of the difference between the signal quality of the first neigh-boring cell measured for the i$^{th}$ time and the signal quality of the first neighboring cell measured for the (i–1)$^{th}$ time is greater than or equal to the signal quality difference threshold.

It may be understood that the terminal device starts the timer if signal quality of each of all cells on the first frequency conforms to the descriptions in the case 3.

Case 4: The terminal device starts the timer if signal quality of the first neighboring cell measured by the terminal device for N consecutive times is less than the signal quality threshold, and a difference between a first signal quality difference and a second signal quality difference meets the signal quality difference threshold.

The first signal quality difference is a difference between signal quality of the first neighboring cell measured by the terminal device for an i$^{th}$ time and signal quality of the first cell obtained when the terminal device measures the first neighboring cell for the i$^{th}$ time. The second signal quality difference is a difference between signal quality of the first neighboring cell measured by the terminal device for an (i–1)$^{th}$ time and signal quality of the first cell obtained when the terminal device measures the first neighboring cell for the (i–1)$^{th}$ time.

For related descriptions in which the first signal quality difference and the second signal quality difference meet the signal quality difference threshold, refer to the related descriptions in which the difference between the signal quality of the first neighboring cell measured for the i$^{th}$ time and the signal quality of the first neighboring cell measured for the (i–1)$^{th}$ time meets the signal quality difference threshold in the case 3. Details are not described herein again.

It may be understood that the terminal device starts the timer if signal quality of each of all cells on the first frequency conforms to the descriptions in the case 4.

Case 5: The terminal device starts the timer if the terminal device has not measured the first neighboring cell within measurement duration T starting from the first time of measurement on the first neighboring cell by the terminal device.

In this embodiment of this application, a quantity of times of measurement on the first neighboring cell is not limited within the measurement duration T starting from the first time of measurement on the first neighboring cell by the terminal device.

It may be understood that the terminal device starts the timer if signal quality of each of all cells on the first frequency conforms to the descriptions in the case 5.

Case 6: The terminal device starts the timer if the terminal device measures the first neighboring cell for M times within measurement duration T starting from the first time of measurement on the first neighboring cell by the terminal device, and signal quality of the first neighboring cell measured for the M times is lower than the signal quality threshold, where M is a positive integer.

It may be understood that the terminal device starts the timer if signal quality of each of all cells on the first frequency conforms to the descriptions in the case 6.

Case 7: The terminal device starts the timer if the terminal device measures the first neighboring cell for M times within measurement duration T starting from the first time of measurement on the first neighboring cell by the terminal device, signal quality of the first neighboring cell measured for the M times is lower than the signal quality threshold, and a difference between signal quality of the first neigh-boring cell measured for a j$^{th}$ time and signal quality of the first neighboring cell measured for a $(j-1)^{th}$ time meets the signal quality difference threshold, where j is a positive integer ranging from 2 to M.

For descriptions in which the difference between the signal quality of the first neighboring cell measured for the $j^{th}$ time and the signal quality of the first neighboring cell measured for the $(j-1)^{th}$ time meets the signal quality difference threshold, refer to the related descriptions in the case 3. Details are not described herein again.

It may be understood that the terminal device starts the timer if signal quality of each of all cells on the first frequency conforms to the descriptions in the case 7.

Case 8: The terminal device starts the timer if the terminal device measures the first neighboring cell for M times within measurement duration T starting from the first time of measurement on the first neighboring cell by the terminal device, signal quality of the first neighboring cell measured for the M times is lower than the signal quality threshold, and a difference between a third signal quality difference and a fourth signal quality difference meets the signal quality difference threshold.

The third signal quality difference is a difference between signal quality of the first neighboring cell measured by the terminal device for a $j^{th}$ time within the measurement duration T and signal quality of the first cell obtained when the terminal device measures the first neighboring cell for the $j^{th}$ time. The fourth signal quality difference is a difference between signal quality of the first neighboring cell measured by the terminal device for a $(j-1)^{th}$ time within the measurement duration T and signal quality of the first cell obtained when the terminal device measures the first neighboring cell for the $(j-1)^{th}$ time.

For related descriptions in which the difference between the third signal quality difference and the fourth signal quality difference meets the signal quality difference threshold, refer to the related descriptions in the case 3. Details are not described herein again.

It may be understood that the terminal device may start the timer when the condition described in any one of the foregoing eight cases is met, or may start the timer when a condition obtained by combining any plurality of cases in the foregoing eight cases is met. For example, the terminal device starts the timer when a condition obtained by combining the case 4 and the case 5 is met.

According to the communication method provided in this embodiment of this application, the terminal device may stop measurement on the first neighboring cell/the first frequency, decrease the priority of the first neighboring cell/the first frequency, or delete the first neighboring cell/ the first frequency based on the first configuration information sent by the network device. Therefore, when quality of the first neighboring cell/the first frequency is poor or the first neighboring cell/the first frequency cannot be measured, a quantity of times of measurement on the first neighboring cell/the first frequency can be reduced, thereby reducing energy consumption of the terminal device.

Figure 8B:
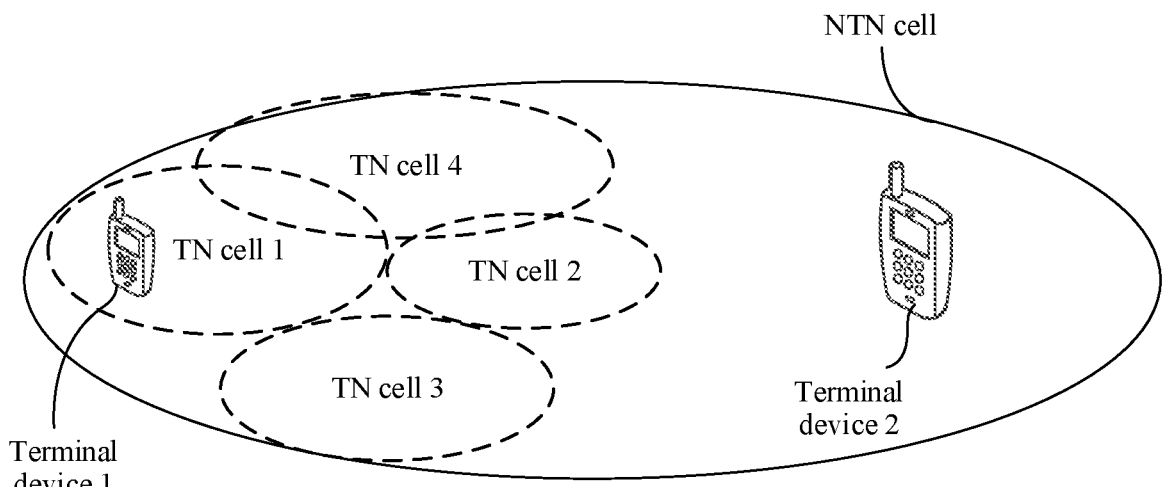
FIG. 8*b* is a schematic diagram of an application scenario of a communication method according to an embodiment of this application.

For example, as shown in FIG. 8b, it is assumed that a terminal device 1 is at a location, in a coverage area of an NTN cell, that is covered by a TN cell and a terminal device 2 is at a location, in the coverage area of the NTN cell, that is not covered by a TN cell. Theoretically, the terminal device 2 does not need to measure a TN neighboring cell of the NTN cell. However, because neighboring cell configuration is performed at a granularity of a cell, the terminal device 2 also actually measures the TN neighboring cell, thereby wasting a large amount of energy consumption.

According to the communication method provided in this embodiment of this application, the terminal device 2 may stop measurement on the TN neighboring cell, decrease a priority of the TN neighboring cell, or delete the TN neighboring cell based on the first configuration information, to reduce a quantity of times of measurement on the TN neighboring cell, and further reduce energy consumption of the terminal device.

It may be understood that the foregoing method is applicable to a scenario in which there is an NTN cell, but should not constitute any limitation on this application. This application is further applicable to another scenario, for example, is applicable to a scenario in which there is a cell with a large coverage area.

The processor 301 in the network device 30 shown in FIG. 5 may invoke application program code stored in the memory 302, to indicate the network device to perform the actions of the network device in steps S801 to S803. The processor 401 in the terminal device 40 shown in FIG. 5 may invoke application program code stored in the memory 402, to indicate the network device to perform the actions of the terminal device in steps S801 to S803. This is not limited in this embodiment.

It should be noted that the communication method shown in FIG. 8a in this embodiment of this application may be separately performed, or may be performed based on the communication method shown in FIG. 7a. For example, the first configuration information may be used to deactivate measurement on at least one of the one or more neighboring frequencies corresponding to the first sub-area. When the terminal device performs measurement based on the information about the one or more neighboring frequencies corresponding to the first sub-area, if one neighboring frequency in the one or more neighboring frequencies corresponding to the first sub-area is not measured for N consecutive times, the terminal device starts the timer, and within the running time of the timer, stops measurement on the neighboring frequency, decreases a priority of the neighboring frequency, or deletes the priority of the neighboring frequency. In this case, energy consumption of the terminal device can be further reduced.

It may be understood that in the embodiments of this application, the terminal device and/or the network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

In the embodiments of this application, unless otherwise specified or there is a logical conflict, terms and/or descriptions between different embodiments are consistent and may be mutually referenced, and technical features in different embodiments may be combined according to an internal logical relationship thereof, to form a new embodiment.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component (for example, a chip or a circuit) that can be used in the network device.

The foregoing mainly describes the solutions provided in the embodiments of this application from a perspective of interaction between the network elements. Correspondingly, an embodiment of this application further provides a communication apparatus. The communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the network device in the foregoing method embodiments, or an apparatus including the foregoing network device, or a component that can be used in the network device. It may be understood that, to implement the foregoing functions, the communication apparatus includes corresponding hardware structures and/or software modules for performing the functions. A person skilled in the art should easily be aware that, in combination with the units and algorithm steps in the examples described in the embodiments disclosed in this specification, this application can be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, the communication apparatus may be divided into functional modules according to the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that in the embodiments of this application, division into modules is an example, and is merely logical function division. During actual implementation, there may be another division manner.

Figure 9:
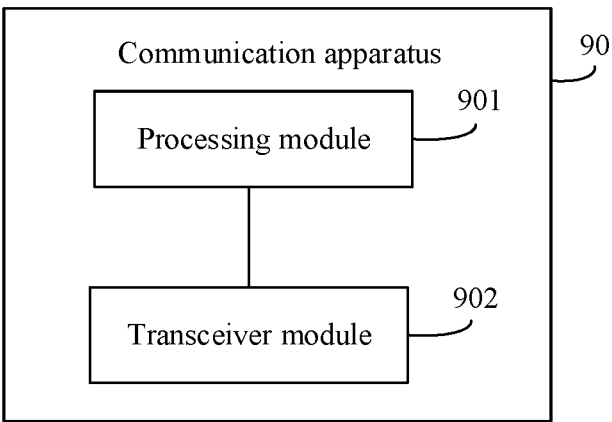
FIG. 9 is a schematic diagram of a structure of a communication apparatus according to an embodiment of this application.

For example, the communication apparatus implements the steps of the terminal device in the foregoing method embodiments. FIG. 9 is a schematic diagram of a structure of a communication apparatus 90. The communication apparatus 90 includes a processing module 901 and a transceiver module 902. The transceiver module 902 may also be referred to as a transceiver unit, and is configured to implement a sending function and/or a receiving function. For example, the transceiver module 902 may be a transceiver circuit, a transceiver machine, a transceiver, or a communication interface.

The transceiver module 902 may include a receiving module and a sending module, which are respectively configured to perform receiving and sending steps performed by the terminal device in the foregoing method embodiments. The processing module 901 may be configured to perform steps other than the receiving and sending steps performed by the terminal device in the foregoing method embodiments.

In a possible implementation, the transceiver module 902 is configured to receive area configuration information from a network device, where the area configuration information indicates a plurality of sub-areas, and a geographical area range including the plurality of sub-areas includes a coverage area of a first cell. The processing module 901 is configured to determine a first sub-area based on the area configuration information, where the first sub-area is a sub-area in which the communication apparatus 90 is currently located in the plurality of sub-areas. The processing module 901 is further configured to perform measurement based on information about one or more neighboring frequencies and/or one or more neighboring cells corresponding to the first sub-area.

Optionally, that the processing module 901 is configured to start a timer includes: The processing module 901 is configured to start the timer if the first neighboring cell is not measured for N consecutive times; the processing module 901 is configured to start the timer if signal quality of the first neighboring cell measured for N consecutive times is lower than a signal quality threshold; the processing module 901 is configured to start the timer if signal quality of the first neighboring cell measured for N consecutive times is lower than a signal quality threshold, and a difference between signal quality of the first neighboring cell measured for an $i^{th}$ time and signal quality of the first neighboring cell measured for an $(i-1)^{th}$ time meets a signal quality difference threshold, where i is a positive integer, and a value of i ranges from 2 to N; or the processing module 901 is configured to start the timer if signal quality of the first neighboring cell measured for N consecutive times is lower than a signal quality threshold, and a difference between a first signal quality difference and a second signal quality difference meets a signal quality difference threshold.

Optionally, the area configuration information includes a user-readable name of each of the plurality of sub-areas, and that the processing module 901 is configured to determine a first sub-area based on the area configuration information includes: The processing module 901 is configured to determine a sub-area corresponding to a first user-readable name in the area configuration information as the first sub-area, where the first user-readable name is a user-readable name corresponding to a current geographical location of the communication apparatus 90.

Optionally, the transceiver module 902 is further configured to send a request message to the network device, where the request message carries indication information of the first sub-area, and the request message is used to request the information about the one or more neighboring frequencies and/or the one or more neighboring cells corresponding to the first sub-area.

In another possible implementation, the transceiver module 902 is configured to receive first configuration information from a network device, where the first configuration information is used to deactivate measurement on a first neighboring cell. The processing module 901 is configured to stop measurement on the first neighboring cell, or decrease a priority of the first neighboring cell based on the first configuration information, where the first neighboring cell includes at least one neighboring cell of a first cell.

Optionally, the first configuration information includes information about a timer. That the processing module 901 is configured to stop measurement on the first neighboring cell, decrease a priority of the first neighboring cell, or delete the first neighboring cell based on the first configuration information includes: The processing module 901 is configured to start the timer; and within running time of the timer, the processing module 901 is further configured to stop measurement on the first neighboring cell, decrease the priority of the first neighboring cell, or delete the first neighboring cell.

Optionally, that the processing module 901 is configured to start a timer includes: The processing module 901 is configured to start the timer if the first neighboring cell is not measured within measurement duration T starting from the first time of measurement on the first neighboring cell; the processing module 901 is configured to start the timer if the first neighboring cell is measured for M times within measurement duration T starting from the first time of measurement on the first neighboring cell, and signal quality of the first neighboring cell measured for the M times is lower than a signal quality threshold; the processing module 901 is configured to start the timer if the first neighboring cell is measured for M times within measurement duration T starting from the first time of measurement on the first neighboring cell, signal quality of the first neighboring cell measured for the M times is lower than a signal quality threshold, and a difference between signal quality of the first neighboring cell measured for a $j^{th}$ time and signal quality of the first neighboring cell measured for a $(j-1)^{th}$ time meets a signal quality difference threshold; or the processing module 901 is configured to start the timer if the first neighboring cell is measured for M times within measurement duration T starting from the first time of measurement on the first neighboring cell, signal quality of the first neighboring cell measured for the M times is lower than a signal quality threshold, and a difference between a third signal quality difference and a fourth signal quality difference meets a signal quality difference threshold.

Optionally, that the processing module 901 is configured to start a timer includes: The processing module 901 is configured to start the timer if the first neighboring cell is not measured within measurement duration T starting from the first time of measurement on the first neighboring cell; the processing module 901 is configured to start the timer if the first neighboring cell is measured for M times within measurement duration T starting from the first time of measurement on the first neighboring cell, and signal quality of the first neighboring cell measured for the M times is lower than a signal quality threshold; the processing module 901 is configured to start the timer if the first neighboring cell is measured for M times within measurement duration T starting from the first time of measurement on the first neighboring cell, signal quality of the first neighboring cell measured for the M times is lower than a signal quality threshold, and a difference between signal quality of the first neighboring cell measured for a $j^{th}$ time and signal quality of the first neighboring cell measured for a $(j-1)^{th}$ time meets a signal quality difference threshold; or the processing module 901 is configured to start the timer if the first neighboring cell is measured for M times within measurement duration T starting from the first time of measurement on the first neighboring cell, signal quality of the first neighboring cell measured for the M times is lower than a signal quality threshold, and a difference between a third signal quality difference and a fourth signal quality difference meets a signal quality difference threshold.

All related content of the steps in the foregoing method embodiments may be cited in function descriptions of corresponding functional modules. Details are not described herein again.

Optionally, the communication apparatus 90 may further include a storage module (not shown in FIG. 9), configured to store data and/or instructions. The processing module 901 may read the data or the instructions in the storage module, to implement the methods corresponding to the foregoing embodiments.

It may be understood that the foregoing modules may be independently disposed, or may be integrated. This is not limited in this embodiment of this application.

In a possible manner, the communication apparatus 90 is presented in a form of functional modules obtained through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus 90 may be in a form of the terminal device 40 shown in FIG. 5.

For example, the processor 401 in the terminal device 40 shown in FIG. 5 may invoke the computer-executable instructions stored in the memory 402, to enable the terminal device 40 to perform the communication methods in the foregoing method embodiments.

Specifically, the processor 401 in the terminal device 40 shown in FIG. 5 may invoke the computer-executable instructions stored in the memory 402, to implement functions/implementation processes of the processing module 901 and the transceiver module 902 in FIG. 9. Alternatively, the processor 401 in the terminal device 40 shown in FIG. 5 may invoke the computer-executable instructions stored in the memory 402, to implement functions/implementation processes of the processing module 901 in FIG. 9, and the transceiver 403 in the terminal device 40 shown in FIG. 5 may implement functions/implementation processes of the transceiver module 902 in FIG. 9.

The communication apparatus 90 provided in this embodiment may be configured to perform the foregoing communication method. Therefore, for technical effects that can be achieved by the communication apparatus, refer to the foregoing method embodiments. Details are not described herein.

Figure 10:
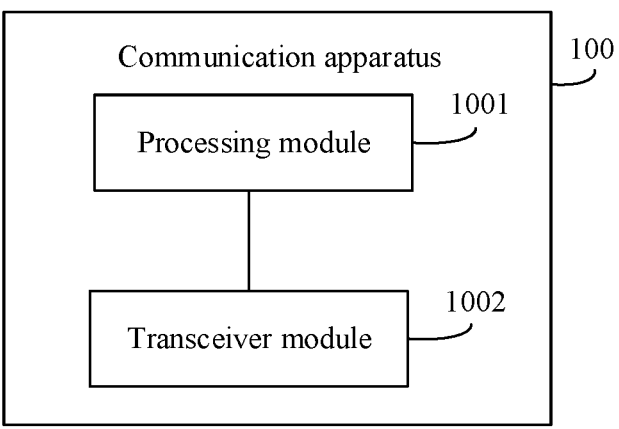
FIG. 10 is a schematic diagram of a structure of another communication apparatus according to an embodiment of this application.

Alternatively, for example, the communication apparatus implements the steps of the network device in the foregoing method embodiments. FIG. 10 is a schematic diagram of a structure of a communication apparatus 100. The communication apparatus 100 includes a processing module 1001 and a transceiver module 1002. The transceiver module 1002 may also be referred to as a transceiver unit, and is configured to implement a sending function and/or a receiving function. For example, the transceiver module 1002 may be a transceiver circuit, a transceiver machine, a transceiver, or a communication interface.

The transceiver module 1002 may include a receiving module and a sending module, which are respectively configured to perform receiving and sending steps performed by the network device in the foregoing method embodiments. The processing module 1001 may be configured to perform steps other than the receiving and sending steps performed by the network device in the foregoing method embodiments.

In a possible implementation, the processing module 1001 is configured to determine a plurality of sub-areas, where a geographical area range including the plurality of sub-areas includes a coverage area of a first cell. The transceiver module 1002 is configured to send area configuration information to a terminal device, where the area configuration information indicates information about the plurality of sub-areas.

Optionally, the transceiver module 1002 is further configured to send information about one or more neighboring frequencies corresponding to a first sub-area to the terminal device, where the first sub-area is a sub-area in the plurality of sub-areas.

Optionally, the transceiver module 1002 is further configured to receive a request message from the terminal device, where the request message carries indication information of the first sub-area, and the request message is used to request the information about the one or more neighboring frequencies corresponding to the first sub-area.

In another possible implementation, the processing module 1001 is configured to determine first configuration information, where the first configuration information is used to deactivate measurement on a first neighboring cell. The transceiver module 1002 is configured to send the first configuration information to the terminal device.

All related content of the steps in the foregoing method embodiments may be cited in function descriptions of corresponding functional modules. Details are not described herein again.

Optionally, the communication apparatus 100 may further include a storage module (not shown in FIG. 10), configured to store data and/or instructions. The processing module 1001 may read the data or the instructions in the storage module, to implement the methods corresponding to the foregoing embodiments.

It may be understood that the foregoing modules may be independently disposed, or may be integrated. This is not limited in this embodiment of this application.

In a possible manner, the communication apparatus 100 is presented in a form of functional modules obtained through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus 100 may be in a form of the network device 30 shown in FIG. 5.

For example, the processor 301 in the network device 30 shown in FIG. 5 may invoke the computer-executable instructions stored in the memory 302, to enable the network device 30 to perform the communication methods in the foregoing method embodiments.

Specifically, the processor 301 in the network device 30 shown in FIG. 5 may invoke the computer-executable instructions stored in the memory 302, to implement functions/implementation processes of the processing module 1001 and the transceiver module 1002 in FIG. 10. Alternatively, the processor 301 in the network device 30 shown in FIG. 5 may invoke the computer-executable instructions stored in the memory 302, to implement functions/implementation processes of the processing module 1001 in FIG. 10, and the transceiver 303 in the network device 30 shown in FIG. 5 may implement functions/implementation processes of the transceiver module 1002 in FIG. 10.

The communication apparatus 100 provided in this embodiment may be configured to perform the foregoing communication method. Therefore, for technical effects that can be achieved by the communication apparatus, refer to the foregoing method embodiments. Details are not described herein.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to instruct the communication apparatus to perform the method in any one of the foregoing method embodiments. Certainly, the memory may not be located in the communication apparatus. In another possible design, the communication apparatus further includes an interface circuit. The interface circuit is a code/data read/write interface circuit, and the interface circuit is configured to: receive computer-executable instructions (where the computer-executable instructions are stored in a memory, may be directly read from the memory, or may pass through another component), and transmit the computer-executable instructions to the processor. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the foregoing apparatuses.

Although this application is described with reference to the embodiments herein, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and the embodiments thereof, it is clear that various modifications and combinations may be made to them without departing from the scope of this application. Correspondingly, the specification and accompanying drawings are merely example descriptions of this application defined by the appended claims, and are considered as any of or all modifications, variations, combinations or equivalents that cover the scope of this application. Clearly, a person skilled in the art can make various modifications and variations to this application without departing from scope of this application. This application is intended to cover the modifications and variations of this application provided that they fall within the scope of the following claims and equivalent technologies of this application.

What is claimed is:

1. A method, applied for a terminal device, the method comprising:

receiving area configuration information from a network device, wherein the area configuration information indicates information about a plurality of sub-areas, and a geographical area range of the plurality of sub-areas overlaps a coverage area of a first cell, wherein the first cell is a non-terrestrial network (NTN) cell in which the terminal device locates, and wherein the area configuration information comprises center location coordinate information of each sub-area of the plurality of sub-areas and area radius information of each sub-area of the plurality of sub-areas;

determining a first sub-area based on the area configuration information, wherein the first sub-area is a sub-area in which the terminal device is currently located in the plurality of sub-areas; and performing measurement based on information about one or more terrestrial network (TN) neighboring frequencies corresponding to the first sub-area, wherein information about each neighboring frequency in the information about the one or more TN neighboring frequencies comprises an absolute radio frequency channel number (ARFCN) of each neighboring frequency in the information about the one or more TN neighboring frequencies.

2. The method according to claim 1, wherein determining the first sub-area based on the area configuration information comprises:

obtaining current geographical location information of the terminal device; and determining the first sub-area based on the current geographical location information of the terminal device and the area configuration information.

3. The method according to claim 2, wherein the current geographical location information of the terminal device is location coordinate information of a current geographical location of the terminal device.

4. The method according to claim 1, further comprising:

sending a request message to the network device, wherein the request message carries indication information of the first sub-area, and the request message requests the information about the one or more TN neighboring frequencies corresponding to the first sub-area.

5. The method according to claim 4, wherein:

the indication information is a first preamble, and the first preamble corresponds to the first sub-area.

6. The method according to claim 4, wherein:

the indication information is a first preamble and a first access resource, and both the first preamble and the first access resource correspond to the first sub-area.

7. The method according to claim 1, wherein the information about the one or more TN neighboring frequencies further comprises one or more of the following:

a physical cell identifier (PCI), a synchronization signal block-based measurement timing configuration (SMTC), an SMTC start offset, a network identifier corresponding to the ARFCN comprised in the information about each neighboring frequency, a type identifier corresponding to the ARFCN comprised in the information about each neighboring frequency, a network identifier corresponding to the PCI, a type identifier corresponding to the PCI, or a priority corresponding to the ARFCN comprised in the information about each neighboring frequency.

8. A method, comprising:

determining a plurality of sub-areas, wherein a geographical area range of the plurality of sub-areas overlaps a coverage area of a first cell, wherein the first cell is a non-terrestrial network (NTN) cell in which a terminal device locates; and sending area configuration information to the terminal device, wherein the area configuration information comprises center location coordinate information of each sub-area of the plurality of sub-areas and area radius information of each sub-area of the plurality of sub-areas; and wherein the area configuration information is usable for determining a first sub-area, and the first sub-area is a sub-area in which the terminal device is currently located and is in the plurality of sub-areas, and measurement is performed based on information about one or more terrestrial network (TN) neighboring frequencies corresponding to the first sub-area, and wherein information about each neighboring frequency in the information about the one or more TN neighboring frequencies comprises an absolute radio frequency channel number (ARFCN) of each neighboring frequency in the information about the one or more TN neighboring frequencies.

9. The method according to claim 8, further comprising:

sending the information about the one or more TN neighboring frequencies corresponding to the first sub-area to the terminal device.

10. The method according to claim 9, further comprising:

receiving a request message from the terminal device, wherein the request message carries indication information of the first sub-area, and the request message requests the information about the one or more TN neighboring frequencies corresponding to the first sub-area.

11. The method according to claim 10, wherein:

the indication information is a first preamble, and the first preamble corresponds to the first sub-area.

12. The method according to claim 10, wherein:

the indication information is a first preamble and a first access resource, and both the first preamble and the first access resource correspond to the first sub-area.

13. The method according to claim 8, wherein the information about the one or more TN neighboring frequencies further comprises one or more of the following:

a physical cell identifier (PCI), a synchronization signal block-based measurement timing configuration (SMTC), an SMTC start offset, a network identifier corresponding to the ARFCN comprised in the information about each neighboring frequency, a type identifier corresponding to the ARFCN comprised in the information about each neighboring frequency, a network identifier corresponding to the PCI, a type identifier corresponding to the PCI, or a priority corresponding to the ARFCN comprised in the information about each neighboring frequency.

14. An apparatus, applied to a terminal device, the apparatus comprising:

at least one processor and non-transitory memory, wherein the memory stores a program to be executed by the at least one processor, the program including instructions for:

receiving area configuration information from a network device, wherein the area configuration information indicates information about a plurality of sub-areas, and a geographical area range of the plurality of sub-areas overlaps a coverage area of a first cell, and wherein the first cell is a non-terrestrial network (NTN) cell in which the terminal device locates, and wherein the area configuration information comprises center location coordinate information of each sub-area of the plurality of sub-areas and area radius information of each sub-area of the plurality of sub-areas;

determining a first sub-area based on the area configuration information, wherein the first sub-area is a sub-area in which a terminal device is currently located in the plurality of sub-areas; and performing measurement based on information about one or more terrestrial network (TN) neighboring frequencies corresponding to the first sub-area, and wherein information about each neighboring frequency in the information about the one or more TN neighboring frequencies comprises an absolute radio frequency channel number (ARFCN) of each neighboring frequency in the information about the one or more TN neighboring frequencies.

15. The apparatus according to claim 14, wherein determining the first sub-area based on the area configuration information comprises:

obtaining current geographical location information of the terminal device; and determining the first sub-area based on the current geographical location information of the terminal device and the area configuration information.

16. The apparatus according to claim 15, wherein the current geographical location information of the terminal device is location coordinate information of a current geographical location of the terminal device.

17. The apparatus according to claim 14, wherein the program further comprises instructions for:

sending a request message to the network device, wherein the request message carries indication information of the first sub-area, and the request message requests the information about the one or more TN neighboring frequencies corresponding to the first sub-area.

18. The apparatus according to claim 17, wherein:

the indication information is a first preamble, and the first preamble corresponds to the first sub-area.

19. The apparatus according to claim 17, wherein:

the indication information is a first preamble and a first access resource, and both the first preamble and the first access resource correspond to the first sub-area.

20. The apparatus according to claim 14, wherein the information about the one or more TN neighboring frequencies further comprises one or more of the following:

a physical cell identifier (PCI), a synchronization signal block-based measurement timing configuration (SMTC), an SMTC start offset, a network identifier corresponding to the ARFCN comprised in the information about each neighboring frequency, a type identifier corresponding to the ARFCN comprised in the information about each neighboring frequency, a network identifier corresponding to the PCI, a type identifier corresponding to the PCI, or a priority corresponding to the ARFCN comprised in the information about each neighboring frequency.

* * * * *